(12) United States Patent
Song et al.

(10) Patent No.: US 8,518,498 B2
(45) Date of Patent: Aug. 27, 2013

(54) LIQUID CRYSTAL DISPLAY AND MANUFACTURING METHOD THEREOF

(75) Inventors: Ki-Yong Song, Seoul (KR); Ki-Yeup Lee, Yongin-si (KR); Jae-Hong Kim, Seoul (KR); Yoon-Ho Kang, Yongin-si (KR); Yong-Hwan Kim, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 2 days.

(21) Appl. No.: 12/874,068

(22) Filed: Sep. 1, 2010

(65) Prior Publication Data

US 2011/0051057 A1    Mar. 3, 2011

(30) Foreign Application Priority Data

Sep. 2, 2009   (KR) ................. 10-2009-0082539
Mar. 8, 2010   (KR) ................. 10-2010-0020356

(51) Int. Cl.
| | | |
|---|---|---|
| C09K 19/00 | (2006.01) | |
| C09K 19/52 | (2006.01) | |
| C09K 19/02 | (2006.01) | |
| C08F 2/48  | (2006.01) | |
| G02F 1/1333 | (2006.01) | |

(52) U.S. Cl.
USPC ......... 428/1.1; 252/299.01; 349/86; 349/106; 349/182; 427/487; 427/508

(58) Field of Classification Search
USPC .............. 428/1.1; 252/299.01; 349/86, 106; 349/182; 427/487, 508
See application file for complete search history.

(56) References Cited

U.S. PATENT DOCUMENTS

| 2005/0001954 A1 | 1/2005 | Stephenson et al. | |
|---|---|---|---|
| 2005/0036089 A1 | 2/2005 | Lyu | |
| 2006/0232721 A1* | 10/2006 | Um et al. ................. | 349/43 |
| 2009/0213307 A1* | 8/2009 | Chiu et al. ................ | 349/104 |
| 2010/0091219 A1* | 4/2010 | Rho et al. ................. | 349/68 |
| 2010/0213423 A1* | 8/2010 | Shiau et al. ............... | 252/589 |

FOREIGN PATENT DOCUMENTS

| JP | 07-306402 A | 11/1995 |
|---|---|---|
| JP | 07-333647 A | 12/1995 |
| JP | 09-096798 A | 4/1997 |
| JP | 2000-227587 A | 8/2000 |
| JP | 2001-194518 A | 7/2001 |
| JP | 2001-209034 A | 8/2001 |
| JP | 2003-098514 A | 4/2003 |
| JP | 2004-037908 A | 2/2004 |
| JP | 2005-338472 A | 12/2005 |
| JP | 2007-248668 A | 9/2007 |
| JP | 2008-218423 A | 9/2008 |
| JP | 2009-048062 A | 3/2009 |
| KR | 10-0195180 B1 | 2/1999 |
| KR | 10-2001-0088329 A | 9/2001 |
| KR | 2004-0024378 A | 3/2004 |
| KR | 10-0770127 B1 | 10/2007 |
| KR | 2008-0033002 A | 4/2008 |
| KR | 2008-0095663 A | 10/2008 |
| KR | 2009-0008627 A | 1/2009 |

* cited by examiner

*Primary Examiner* — Geraldina Visconti

(74) *Attorney, Agent, or Firm* — Innovation Counsel LLP

(57) ABSTRACT

The present invention relates to a liquid crystal display, wherein arrangement of liquid crystal molecules thereof is controlled by using a monomer that is polymerized by ultraviolet rays to provide a pre-tilt. To prevent damage to organic material layers when irradiating ultraviolet rays to the monomer, a blocking film made of an ultraviolet absorbing agent is formed on or over at least one such layer.

30 Claims, 18 Drawing Sheets

FIG.18
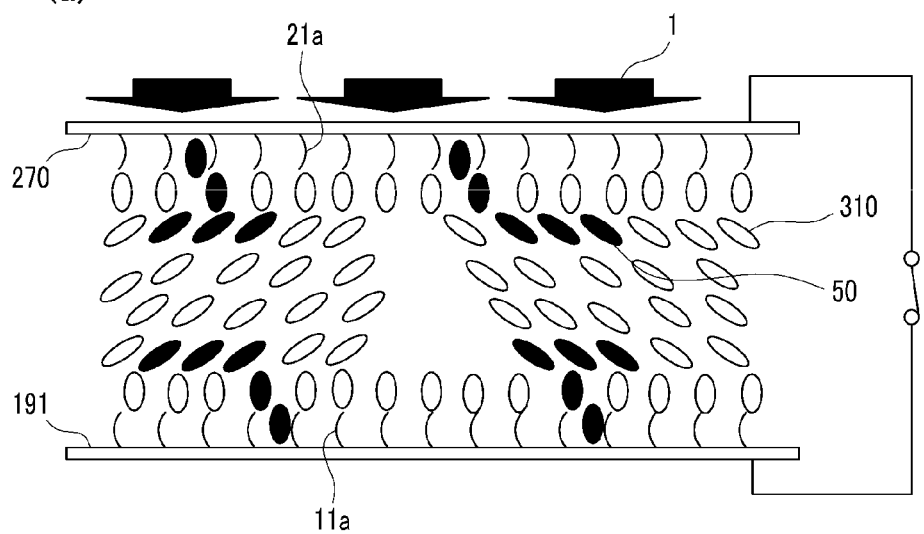
(a)
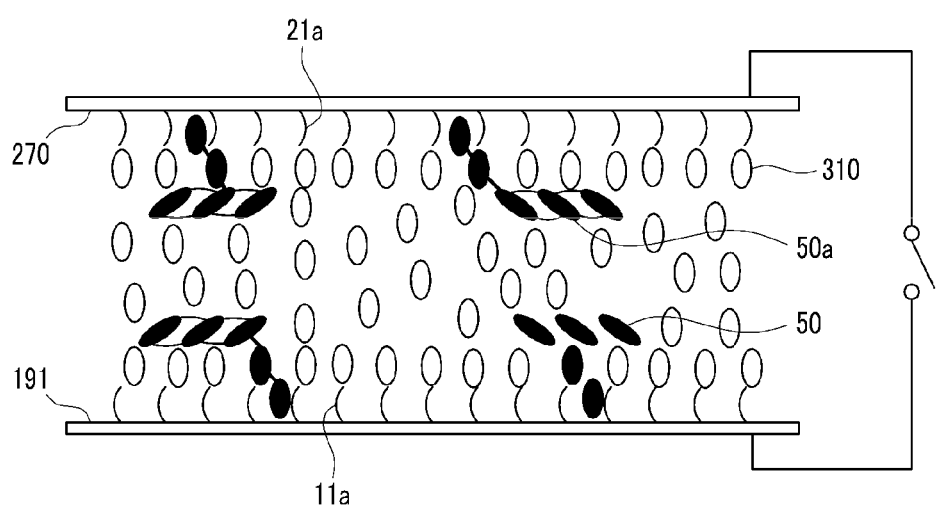
(b)

FIG.20
(a)
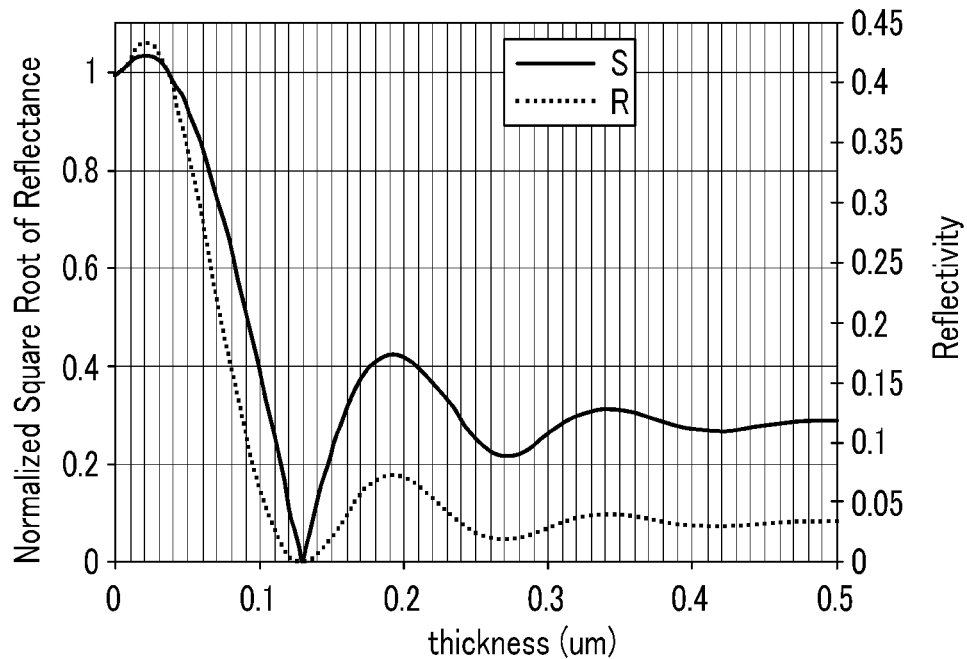
(b)
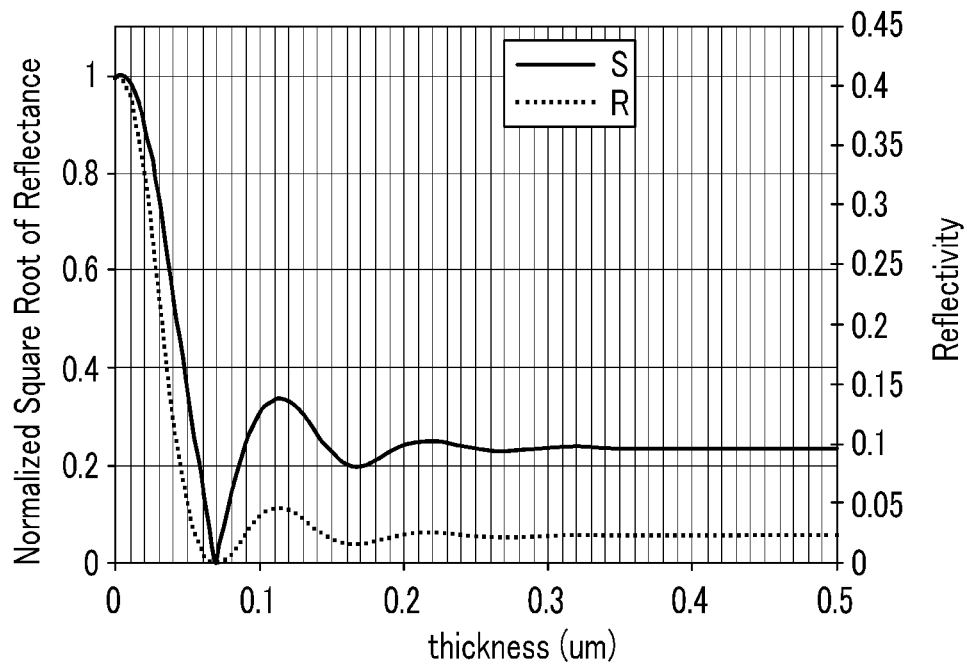

LIQUID CRYSTAL DISPLAY AND MANUFACTURING METHOD THEREOF

CROSS-REFERENCE TO RELATED APPLICATION

This application claims priority to, and the benefit of, Korean Patent Application No. 10-2009-0082539 filed in the Korean Intellectual Property Office on Sep. 2, 2009 and Korean Patent Application No. 10-2010-0020356 filed on Mar. 8, 2010, the entire contents of which are incorporated herein by reference.

BACKGROUND OF THE INVENTION (a) Field of the Invention

The present disclosure relates to a liquid crystal display and to a method for manufacturing a liquid crystal display. In particular, the present disclosure relates to a liquid crystal display and to a manufacturing method thereof.

(b) Description of the Related Art

One type of widely used flat panel display, the liquid crystal display (LCD), typically includes two display panels provided with field generating electrodes such as pixel electrodes and a common electrode, as well as a liquid crystal layer interposed therebetween. The LCD displays images by applying voltages to the field-generating electrodes, generating an electric field in the LC layer that orients the LC molecules therein, which in turn adjusts polarization of incident light.

One type of LCD display is commonly termed a vertical alignment (VA) mode LCD, which aligns LC molecules such that their major axes are perpendicular to the panels in the absence of an electric field. VA mode LCDs have recently come under increased attention due to their relatively high contrast ratio and wide reference viewing angle.

In the vertical alignment (VA) mode liquid crystal display, to obtain a wide viewing angle, pixels are often divided into a plurality of domains in which the alignment directions of the liquid crystal molecules are different. Some current methods of forming multiple domains in a single pixel involve forming minute slits or cutouts in the field generating electrodes, or forming protrusions on the field generating electrodes. The geometry of the cutouts or protrusions generates fringe fields whose orientations align the liquid crystal molecules vertically, and then the plurality of domains may be formed.

However, VA mode liquid crystal displays suffer from a side visibility lower than a front visibility. To overcome the lower side visibility, one pixel may be divided into multiple subpixels, and these subpixels can have differing voltages applied.

The above information disclosed in this Background section is only for enhancement of understanding of the background of the invention, and may not necessarily be prior art.

SUMMARY OF THE INVENTION

The present invention utilizes ultraviolet rays to harden monomers in the liquid crystal layer of an LCD. This allows the liquid crystal layer to have a pre-tilt to form a plurality of domains, and prevents damage to an underlying organic material by ultraviolet rays when hardening the liquid crystal layer.

A liquid crystal display according to an exemplary embodiment of the present invention includes: an upper panel; a lower panel including an insulating layer comprising an organic material, and a blocking film formed on the insulating layer; and a liquid crystal layer formed between the upper panel and the lower panel. The liquid crystal layer has liquid crystal with a pre-tilt at least partially maintained by a polymerized polymer, wherein the blocking layer is made of an ultraviolet absorbing agent.

The ultraviolet absorbing agent may be amorphous titanium oxide.

The polymer may include a first polymerized polymer within the liquid crystal layer, and a second polymer formed along an inner surface of the upper panel and an inner surface of the lower panel, the inner surfaces each facing the liquid crystal layer.

The lower panel may further include a color filter formed under the insulating layer.

A pixel electrode on the blocking film may be further included, wherein the pixel electrode may include a plurality of branch electrodes.

The pixel electrode may have a plurality of sub-regions each having ones of the branch electrodes extending in a different direction from the ones of the branch electrodes in the other sub-regions.

The intervals between the branch electrodes of one sub-region can be different from intervals between branch electrodes of another sub-region.

The lower panel may include: a first substrate; a gate line formed on the first substrate; a step-down gate line parallel to the gate line, a storage electrode line parallel to the gate line; a gate insulating layer covering the gate line, the step-down gate line, and the storage electrode line; a data line intersecting the gate line; first and second sub-pixel electrodes formed on the insulating layer and the blocking film; a first thin film transistor connected to the gate line, the data line, and the first sub-pixel electrode; and a second thin film transistor connected to the gate line, the data line, and the second sub-pixel electrode.

A liquid crystal display according to an exemplary embodiment of the present invention includes: an upper panel; a lower panel including an insulating layer comprising an organic material, and a blocking film formed on the insulating layer; and a liquid crystal layer formed between the upper panel and the lower panel. The liquid crystal layer has liquid crystal with a pre-tilt at least partially maintained by a polymerized polymer, wherein the blocking layer is made of an ultraviolet absorbing agent.

The ultraviolet absorbing agent may be amorphous titanium oxide.

A pixel electrode on the blocking film may be further included, wherein the pixel electrode may include a plurality of branch electrodes.

A manufacturing method of a liquid crystal display according to an exemplary embodiment of the present invention includes: on a lower panel, sequentially forming a color filter, an insulating layer comprising an organic material, and a blocking film in a lower panel; forming a liquid crystal layer between an upper panel and the lower panel; applying an electric field to the liquid crystal layer; and irradiating ultraviolet rays onto the liquid crystal layer.

The liquid crystal layer may include a polymerized monomer.

The monomer may be a reactivity mesogen.

The monomer may be about 0.1-0.5 wt % of the liquid crystal layer.

The polymerized polymer may include a first polymer formed in the liquid crystal layer, and a second polymer formed along surfaces of the upper panel and the lower panel that face each other.

Ultraviolet rays irradiated to the liquid crystal layer may have a wavelength of about 300 nm to about 320 nm.

The method may further include forming a pixel electrode on the insulating layer and the blocking film of the lower panel, and patterning the pixel electrode to form minute branch electrodes after the sequentially forming.

The blocking layer may be made of an ultraviolet absorbing agent.

The ultraviolet absorbing agent may be amorphous titanium oxide.

According to an exemplary embodiment, disclosed is a liquid crystal display panel including a first substrate, a second substrate facing the first substrate, a field generating electrode disposed on at least one of the first substrate and the second substrate, and a liquid crystal layer interposed between the first substrate and the second substrate, and the liquid crystal layer including liquid crystal molecules and a reactive mesogen. At least one of the first substrate and the second substrate includes an ultraviolet (UV)-blocking layer. The UV-blocking layer includes a UV-absorbing agent, and the UV-absorbing agent is an organic material including a chromophore.

The reactive mesogen may be polymerized to an alignment polymer through a UV-irradiating process.

The UV-blocking layer may be disposed on the substrate that is not irradiated by UV rays among the first and second substrates.

The UV-blocking layer may be formed under the field generating electrode.

The UV-absorbing agent may absorb light having a wavelength of less than 400 nm.

The chromophore includes at least one selected from compounds represented by Formulae 1 and 2.

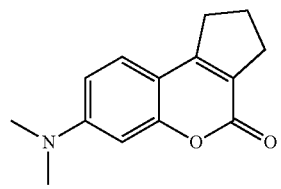

[Formula 1]

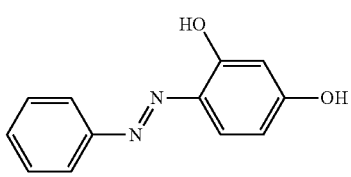

[Formula 2]

The thickness of the UV-blocking layer may be over 0.05 um.

A method for manufacturing a liquid crystal display includes: forming a gate line including a gate electrode on a first substrate, forming a gate insulating layer on the gate line, forming a data line including a source electrode and a drain electrode facing the source electrode on the gate insulating layer, forming a color filter, forming a leveling layer on the color filter, and forming an ultra-violet (UV)-blocking layer on the leveling layer. The method further includes forming a common electrode on a second substrate and interposing a mixture including liquid crystal molecules and a reactive mesogen between the first substrate and the second substrate. The UV-blocking layer includes a UV-absorbing agent, and the UV-absorbing agent is an organic material including a chromophore.

Forming a pixel electrode on the UV-blocking layer of the first substrate may be further included.

Forming a pixel electrode under the UV-blocking layer of the first substrate may be further included.

Applying a voltage to the pixel electrode and the common electrode and irradiating light to the mixture in the state in which the voltage is applied to the pixel electrode and the common electrode to light-polymerize the reactive mesogen may be further included.

Turning off the voltage to the pixel electrode and the common electrode and irradiating light to the mixture in a state in which the voltage is not applied to the pixel electrode and the common electrode to light-polymerize the reactive mesogen may be further included.

The UV-absorbing agent may absorb light having a wavelength of less than 400 nm.

The chromophore may include at least one selected from compounds represented by Formulae 1 and 2.

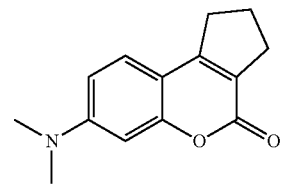

[Formula 1]

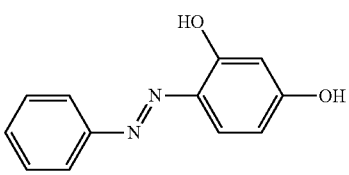

[Formula 2]

According to an exemplary embodiment of the present invention, the monomer included in the liquid crystal layer is hardened by ultraviolet rays to provide the pre-tilt to the liquid crystal layer thereby forming a plurality of domains, and damage to the organic material by ultraviolet rays is prevented during the hardening of the monomer.

BRIEF DESCRIPTION OF THE DRAWINGS

FIGS. 18(*a*)-18(*b*) are schematic diagrams showing a method for forming a pre-tilt of liquid crystal molecules through a reactive mesogen according to an exemplary embodiment of the present invention;

FIGS. 20(*a*)-20(*b*) show graphs representing the UV-blocking effect of a UV-blocking layer.

DETAILED DESCRIPTION OF EMBODIMENTS

Figure 1:
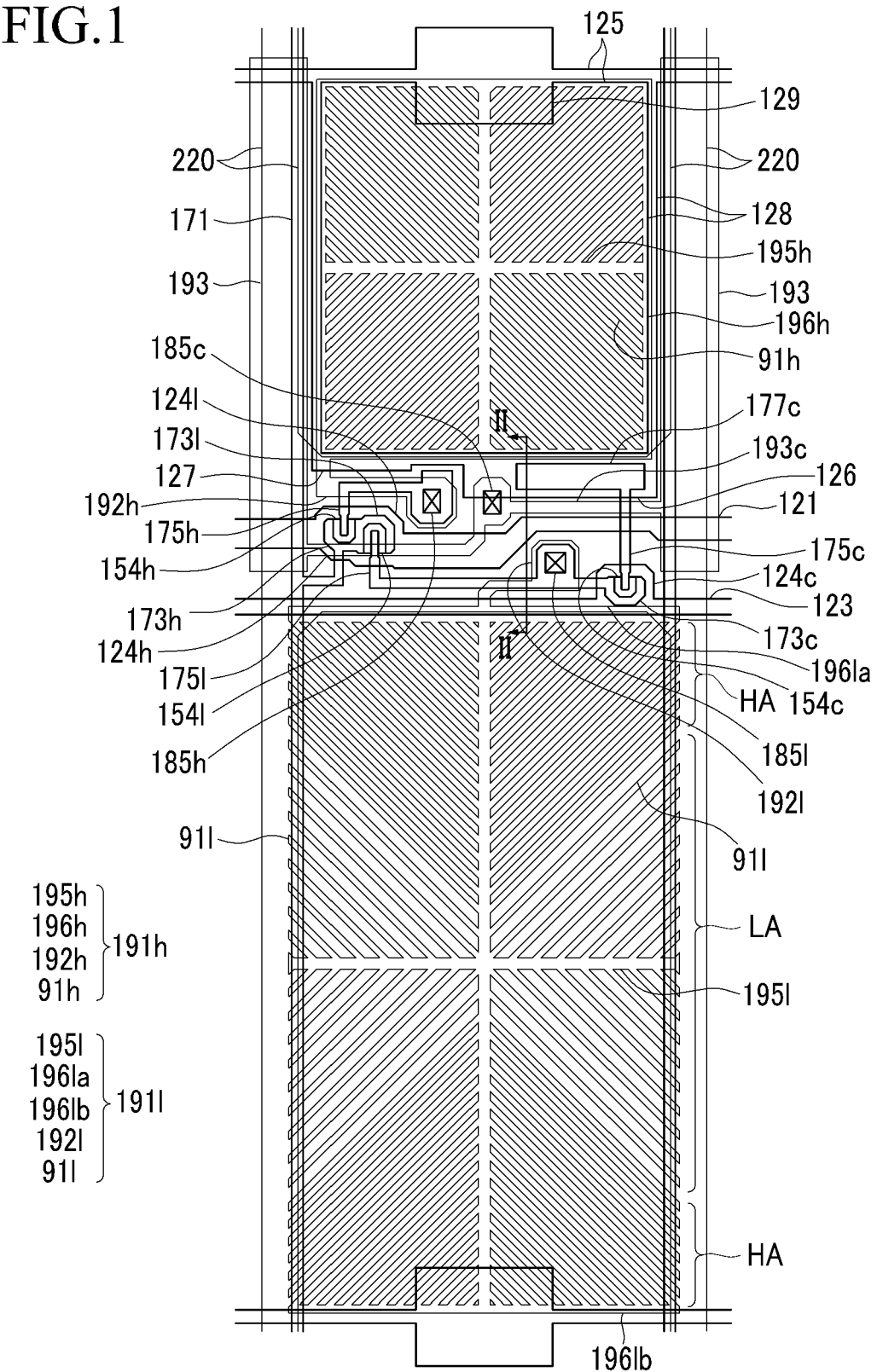
FIG. 1 is a layout view of a liquid crystal panel assembly according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In one embodiment, the present invention relates to a liquid crystal display whose liquid crystal molecules are maintained at a pre-tilt, i.e. are maintained at an inclined orientation, by a polymerized monomer. As the liquid crystal molecules are maintained at an incline, the viewing angle of the display is increased. Additionally, as one approach to polymerizing the monomer involves ultraviolet light irradiation that can be harmful to other organic material layers, some embodiments of the invention employ an additional blocking film made of an ultraviolet absorbing agent formed on or over at least one such layer.

Now, a liquid crystal panel assembly according to an exemplary embodiment of the present invention will be described with reference to FIG. 1 and FIG. 2.

Figure 2:
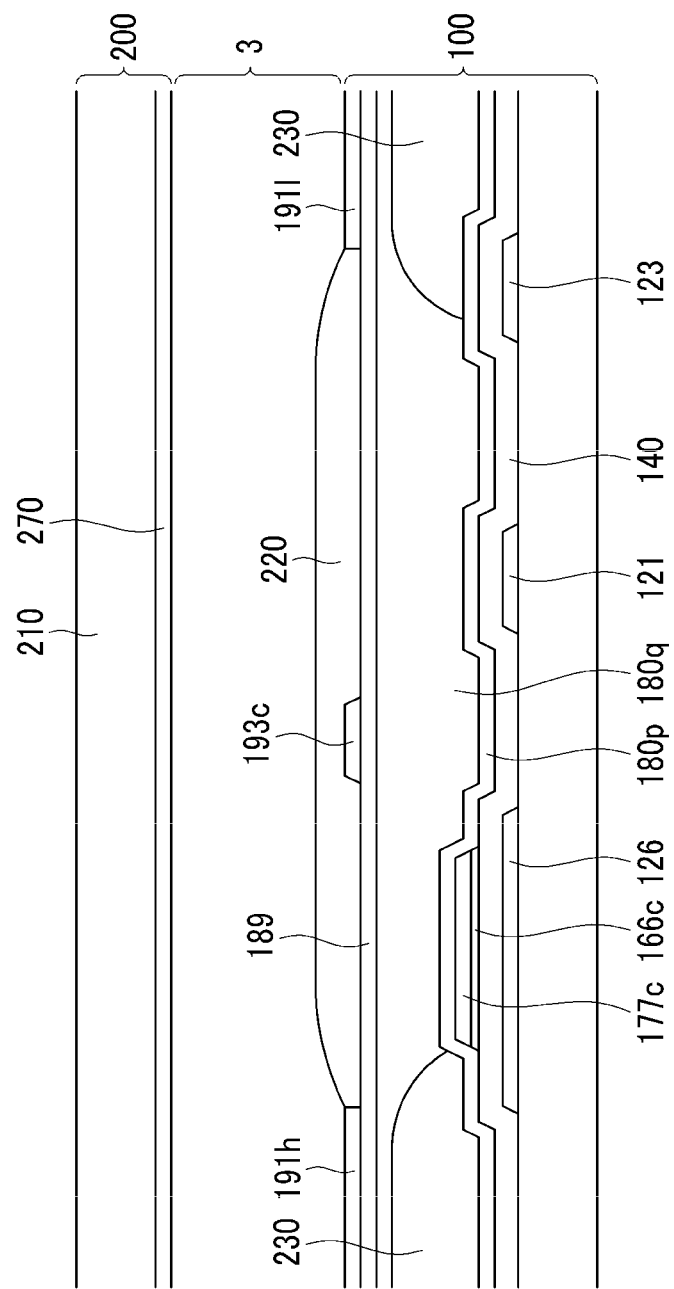
FIG. 2 is a cross-sectional view of a liquid crystal panel assembly taken along the line II-II of FIG. 1.

FIG. 1 is a layout view of a liquid crystal panel assembly according to an exemplary embodiment of the present invention, and FIG. 2 is a cross-sectional view of a liquid crystal panel assembly taken along the line II-II of FIG. 1.

A liquid crystal panel assembly according to the present exemplary embodiment includes a lower panel 100 and an upper panel 200 that face each other, and a liquid crystal layer 3 interposed between two display panels 100 and 200. At least one polarizer (not shown) for polarizing light is attached to the outer surface of at least one of the two display panels 100 and 200.

In the upper panel 200, common electrode 270 is formed on an insulation substrate 210. The common electrode 270 may be made of a transparent conductor such as ITO or IZO. An alignment layer (not shown) may be formed on the common electrode 270.

Liquid crystal molecules 310 between the lower and upper display panels 100 and 200 have negative dielectric anisotropy, and may be oriented such that their major axes may be almost perpendicular to the surfaces of the two display panels 100 and 200 when no electric field is applied. Here, the liquid crystal molecules of the liquid crystal layer 3 have a pre-tilt imparted by polymerizing the liquid crystal using ultraviolet rays. This pre-tilt is further described below with reference to FIG. 4 to FIG. 6.

In lower panel 100 a plurality of gate conductors, including a plurality of gate lines 121, a plurality of step-down gate lines 123, and a plurality of storage electrode lines 125, is formed on an insulation substrate 110.

The gate lines 121 and the step-down gate lines 123 transfer gate signals, and mainly extend in a horizontal direction. Each gate line 121 includes a first gate electrode 124*h* and a second gate electrode 124*l* protruding upward and downward, and each step-down gate line 123 includes a third gate electrode 124*c* protruding upward. The first gate electrode 124*h* and the second gate electrode 124*l* are connected to each other, thereby forming one protrusion.

The storage electrode lines 125 are mainly extended in the horizontal direction, and transfer a predetermined voltage such as a common voltage Vcom. The storage electrode lines 125 each include a storage electrode 129 protruding upward and downward, a pair of longitudinal portions 128 extending almost perpendicular to the gate line 121 downward, and a transverse portion 127 connecting the ends of the pair of longitudinal portions 128 to each other. The transverse portion 127 includes a storage expansion 126 extended downward.

A gate insulating layer 140 is formed on the gate conductors 121, 123, and 125 to cover them.

Semiconductor stripes 151 are formed on the gate insulating layer 140, and can be made of hydrogenated amorphous silicon (a-Si), polysilicon, or the like. The semiconductor stripes 151 extend in a longitudinal direction and include branches that are formed at positions corresponding to the gate electrodes 124*h*, 124*l*, and 124*c*. That is, each semiconductor stripe 151 includes first and second semiconductors 154*h* and 154*l* extending toward, and positioned corresponding to, the first and second gate electrodes 124*h* and 124*l*. The semiconductor stripe 151 also includes a third semiconductor 154*c* extended from the second semiconductor 154*l* and positioned corresponding to the third gate electrode 124*c*.

A plurality of ohmic contact stripes are formed on the semiconductor stripes 151, and expose a portion of the semiconductor stripes 151 at portions corresponding to the gate electrodes 124*h*, 124*l*, and 124*c*. That is, first ohmic contacts (i.e., portions of first source electrode 173*h* and first drain electrode 175*h*) are formed on the first semiconductors 154*h*, and the semiconductor stripes 151 are exposed between the first ohmic contacts. Also, second ohmic contacts (i.e., portions of second source electrode 173*l* and second drain electrode 175*l*) and third ohmic contacts (i.e., portions of third source electrode 173*c* and third drain electrode 175*c*) are formed on the second semiconductors 154*l* and the third semiconductors 154*c* respectively, leaving portions of the semiconductor stripes 151 exposed.

Additionally, a data conductor is formed on the ohmic contacts. This data conductor includes a plurality of data lines 171, a plurality of first drain electrodes 175*h*, a plurality of second drain electrodes 175*l*, and a plurality of third drain electrodes 175*c*.

The data lines 171 transmit data signals and extend in the longitudinal direction thereby intersecting the gate lines 121, the step-down gate lines 123, and the storage electrode lines 125. Each data line 171 includes a first source electrode 173*h* having a "U" shape and a second source electrode 173*l* having an upside-down "U" shape, and extending toward the first gate electrode 124*h* and the second gate electrode 124*l*. One of ordinary skill will observe that the term "U" refers to an approximate, overall shape that may be seen as resembling a "U," rather than a specific requirement that any structure be shaped exactly as the letter "U." The first source electrode 173*h* and the second source electrode 173*l* are electrically connected to each other while sharing one side thereof.

The first drain electrode 175*h* has one end portion having a wider area sufficient to act as a contact pad, and another end portion enclosed by the first source electrode 173*h*. The wide end is preferably of sufficient area to allow for a contact with an upper layer. The second drain electrode 175*l* has one end connected to second source electrode 173*l*, and another end with a wider area sufficient to act as a contact pad, where this wider end has a general "U" shape. The "U" shape forms a third source electrode 173*c*, and is of sufficient area to provide a space that is capable of contacting the upper layer. The third drain electrode 175*c* has one end portion 177*c* having a wider area, and another end portion contacting, and enclosed by, the third source electrode 175*c*. The wide end portion 177*c* overlaps the storage expansion 126, thereby forming the step-down capacitor Cstd.

The first to third gate electrodes 124*h*, 124*l*, and 124*c*, the first to third source electrodes 173*h*, 173*l*, and 173*c*, and the first to third drain electrodes 175*h*, 175*l*, and 175*c* respectively form the first, second, and third thin film transistors (TFT) Qh, Ql, and Qc along with the first to third semiconductors 154*h*, 154*l*, and 154*c*. Here, the channels of the thin film transistors are formed in the semiconductors 154*h*, 154*l*, and 154*c* between the respective source electrodes 173*h*, 173*l*, and 173*c* and drain electrodes 175*h*, 175*l*, and 175*c*. Each channel may be formed in the exposed region that is not covered by the ohmic contacts among the semiconductors 154*h*, 154*l*, and 154*c*.

Also, the semiconductor stripes 151 (i.e., the semiconductors 154*h*, 154*l*, and 154*c* except for the channel region between the source electrodes 173*h*, 173*l*, and 173*c*, and the drain electrodes 175*h*, 175*l*, and 175*c*) can have substantially the same shape as the data conductor 171, 175*h*, 175*l*, and 175*c* and the underlying ohmic contacts. The semiconductor stripes 151 (which include semiconductors 154*h*, 154*l*, and 154*c*) have portions that are exposed without being covered by the data conductors 171, 175*h*, 175*l*, and 175*c*, and portion between the source electrodes 173*h*, 173*l*, and 173*c* and respective drain electrodes 175*h*, 175*l*, and 175*c*.

A lower passivation layer 180*p* is formed on the data conductors 171, 175*h*, 175*l*, 175*c* and the exposed semiconductors 154*h*, 154*l*, and 154*c*. The lower passivation layer 180*p* can be made of an inorganic insulator, such as silicon nitride or silicon oxide.

A color filter 230 is formed on the lower passivation layer 180*p*, and can be made of either an organic material or an inorganic material. The color filter 230 is formed in almost all regions except for areas where the first thin film transistor (Qh), the second thin film transistor (Ql), and the third thin film transistor (Qc) are positioned. Each color filter 230 may (but need not necessarily) display a primary color such as red, green, or blue. Also, each color filter 230 may be formed along the space between the neighboring data lines 171, and color filters 230 of the same color need not necessarily neighbor each other.

An upper passivation layer 180*q* made of an organic material is formed on the lower passivation layer 180*p* and the color filter 230. A blocking film 189 is formed on the upper passivation layer 180*q*. The blocking film 189 is formed of an ultraviolet ray absorption agent to shield the upper passivation layer 180*q* from ultraviolet rays that may damage its organic material. Further, the blocking film 189 may be formed with a uniform thickness, even though the size of the panel is large. The layer thus preferably has uniformity and stability, and the blocking film 189 may be made of a material capable of transmitting visible rays. To obtain these characteristics, in an exemplary embodiment of the present invention, the blocking film 189 is formed of amorphous titanium oxide (TiOx).

The lower passivation layer 180*p* and the upper passivation layer 180*q* have first contact holes 185*h* exposing the wide end portion of the first drain electrode 175*h* and second contact holes 185*l* exposing the wide end portion of the second drain electrode 175*l*. Also, they have third contact holes 185*c* exposing a region that includes the upper portion of the storage expansion 126 and does not overlap the wide end portion 177*c* of the third drain electrode 175*c*.

A pixel electrode is formed on the blocking film 189. This pixel electrode includes the first sub-pixel electrode 191*h* and the second sub-pixel electrode 191*l*, as well as a shielding electrode 193.

First and second sub-pixel electrodes 191*h* and 191*l* neighbor (are adjacent to) each other in the column direction. The height of the second sub-pixel electrode 191*l* may be about one to three times the height of the first sub-pixel electrode 191*h*.

The overall general shape of the first sub-pixel electrode 191*h* is that of a quadrangle, and includes a cross stem 195*h* with a transverse stem and a longitudinal stem, an outer stem 196*h* enclosing the periphery, and a protrusion 192*h* extending downward from the lower portion of the outer stem 196*h* to be electrically connected to the first drain electrode 175*h* through the first contact hole 185*h*. Also, first minute branch electrodes 91*h* are formed, each extending from the cross stem 195*h* to the outer stem 186*h* obliquely as shown.

The overall shape of the second sub-pixel electrode 191*l* is that of a quadrangle, and includes a cross stem 195*l* with a transverse stem and a longitudinal stem, an upper transverse portion 196*la*, a lower transverse portion 196*lb*, and a protrusion 192*l* extending upward from the upper portion of the upper transverse portion 196*la* to be electrically connected to the second drain electrode 175*l* through the second contact hole 185*l*. Also, second minute branch electrodes 91*l* extend obliquely from the cross stem 195*l*.

The first sub-pixel electrode 191*h* and the second sub-pixel electrode 191*l* are respectively divided into four sub-regions by the cross stems 195*h* and 195*l*. Each sub-region includes a plurality of minute branch electrodes 91*h* and 91*l* obliquely extending from the cross stems 195*h* and 195*l*. The minute branch electrodes 91*h* and 91*l* of each sub-region form a minute slit pattern, and the minute branch electrodes 91*h* and 91*l* may be generally oriented at angles of about 45 or 135 degrees with respect to the gate lines 121. The minute branch electrodes 91*h* and 91*l* of two neighboring sub-regions may be crossed.

Referring to FIG. 1, the sub-region of the second sub-pixel electrode 191*l* includes a first region HA where the interval of the minute branch electrodes 91*l* is relatively narrow, and a second region LA where the interval of the minute branch electrodes 91*l* is relatively wide. The width of the minute branch electrodes 91*l* may be uniform within the first region HA and within the second region LA. For example, the width of the minute branch electrodes 91*l* may be about 3.5-4.5 μm, and may preferably be about 3 μm.

The invention contemplates any sizes, distributions, and arrangements of areas HA, LA within 191*l*, 191*h*. As one example, in the exemplary embodiment of FIG. 1, the area of the first region HA may be larger than that of the second region LA in each sub-region of the second sub-pixel electrode 191*l*. As another example, the area ratio of the first region HA to the second region LA may be changed according to the transmittance, i.e. if greater transmittance is desired, the area of region LA can be made larger than that of region HA, and vice versa. Additionally, the relative positions of the first region HA and the second region LA may be changed in the second sub-pixel electrode 191*l* if desired.

In the first region HA, the interval of the minute branch electrodes 91*l* (e.g., the distance between adjacent minute branch electrodes 91*l*) may be in the range of about 2.5-3.5 μm, and may preferably be about 3 μm, and the pitch of the minute branch electrodes 91*l* (e.g., the distance between corresponding points, such as the highest points, of adjacent minute branch electrodes 91*l*) may be in the range of 5-7 μm, and may preferably be about 6 μm. In the second region LA, the interval of the minute branch electrodes 91*l* may be in the range of about 3.5-5.5 μm, and may preferably be about 4-5 μm, and the pitch of the minute branch electrodes 91*l* may be in the range of about 6-9 μm, and may preferably be about 7-8 μm.

On the other hand, the interval, the width, and the pitch of the minute branch electrodes 91*h* of the first sub-pixel electrode 191*h* may be equal to those of the minute branch electrodes 91*l* of the first region HA of the second sub-pixel electrode 191*l*. According to the exemplary embodiment, the width and pitch of the minute branch electrodes 91*h* of the first sub-pixel electrode 191*h* may be equal to those of the minute branch electrodes 91*l* of the second region LA of the second sub-pixel electrode 191*l*, or may be different. Also, any one or more of the width, interval, and pitch may be the same or different from the first region HA to the second region LA.

The above-described values are exemplary, and may be changed as desired, perhaps according to design elements such as cell gap and kind and desired characteristics of the liquid crystal layer 3.

The protrusion 192*h* of the first sub-pixel electrode 191*h* receives the data voltage from the first drain electrode 175*h* through the first contact hole 185*h*, and the protrusion 192*l* of the second sub-pixel electrode 191*l* receives the data voltage from the second drain electrode 175*l* through the second contact hole 185*l*. Here, the data voltage applied to the second sub-pixel electrode 191*l* may be less than the data voltage applied to the first sub-pixel electrode 191*h*.

On the other hand, a shielding electrode 193 is electrically connected to the storage expansion 126 through the third contact hole 185*c*, thereby receiving a predetermined voltage, such as a common voltage Vcom, applied to the storage expansion 126. The shielding electrode 193 covers a portion of the data line 171, thereby electro-magnetically shielding the data line 171, and accordingly a signal delay due to capacitive coupling may be prevented. In other embodiments, the shielding electrode 193 may optionally be connected to the storage expansion 126, so as to increase the storage capacitance of the pixel.

A light blocking member 220 is formed so as to partly overlap a portion of the color filter 230 (i.e., light blocking member 220 is formed partly in an area not occupied by the color filter 230, and partly over the color filter 230). The light blocking member 220 is disposed on the upper insulating layer 180*q*, and is formed on the shielding electrode 193, thereby preventing or reducing light leakage. The light blocking member 220 includes a portion covering the region where the first thin film transistor Qh, the second thin film transistor Ql, and the third thin film transistor Qc are disposed, and a portion positioned corresponding to the data line 171.

An alignment layer (not shown) may be formed on the first and second sub-pixel electrodes 191*h* and 191*l* and the light blocking member 220.

When a data voltage is applied between the first and second sub-pixel electrodes 191*h* and 191*l* and the common electrode 270 of the upper panel 200, an electric field is formed therebetween. This electric field determines the direction of those liquid crystal molecules of the liquid crystal layer 3 that lie between the two electrodes 191 and 270. The inclination of the liquid crystal molecules alters the polarization of incident light, and this change in polarization appears as a change of transmittance by the polarizer, thereby displaying images of the liquid crystal display.

The first and second sub-pixel electrodes 191*h* and 191*l* of an exemplary embodiment of the present invention include four sub-regions, each with branch electrodes 91*h* and 91*l* that extend in different directions. During display, this inclines the liquid crystal molecules 310 in four different directions. By varying the inclination directions of the liquid crystal molecules, the viewing angle of the liquid crystal display is widened.

The first sub-pixel electrode 191*h*, the common electrode 270, and the liquid crystal layer 3 interposed therebetween collectively form a first liquid crystal capacitor Clch. The second sub-pixel electrode 191*l*, the common electrode 270, and the liquid crystal layer 3 interposed therebetween collectively form a second liquid crystal capacitor Clcl, thereby maintaining the voltages at the first and second sub-pixel electrodes 191*h*, 191*l* for some time after the first and second thin film transistors Qh and Ql are turned off.

The first and second sub-pixel electrodes 191*h* and 191*l* overlap the storage electrode lines 125 as well as the storage electrodes 129, thereby forming first and second storage capacitors Csth and Cstl. These second storage capacitors Csth and Cstl enhance the voltage storage capacity of the first and second liquid crystal capacitors Clch and Clcl.

In an exemplary embodiment of the present invention, the voltages of the first sub-pixel electrode 191*h* and the second sub-pixel electrode 191*l* may be changed, as described above, and if the voltages of the first and second sub-pixel electrodes 191*h* and 191*l* are different, the voltages applied to the first and second liquid crystal capacitors Clch and Clcl are different such that the luminances of the two sub-pixels also are different. Accordingly, the voltages of the first and second liquid crystal capacitors Clca and Clcb can be independently controlled to improve lateral visibility. Operations in which the voltages of the first sub-pixel electrode 191*h* and the second sub-pixel electrode 191*l* are changed will be described below.

Furthermore, in an exemplary embodiment of the present invention, each sub-region of the second sub-pixel electrode 191*l* includes a region LA having wider widths of the minute branch electrodes 91*l* and a region HA having narrower widths. The intensity of the electric field in the liquid crystal layer 3 is increased as the widths of the minute branch electrode 91*l* are narrowed. Thus, the regions LA and HG generate two different regions of liquid crystal molecules, where the molecules in each region are inclined, or tilted, differently.

One of ordinary skill will realize that this can be employed to further improve lateral visibility.

In the present exemplary embodiment, the second sub-pixel electrode 191*l* is divided into the region LA having the relatively wide interval of the minute branch electrodes 91*l* and the region HA having the relatively narrow interval thereof. However embodiments of the invention can also include an intermediate region where the interval of the minute branch electrodes is more gradually changed from that of region LA to that of region HA.

Next, a circuit structure and an operation of a liquid crystal display according to an exemplary embodiment of the present invention will be described with reference to FIG. 1 and FIG. 2 as well as FIG. 3.

Figure 3:
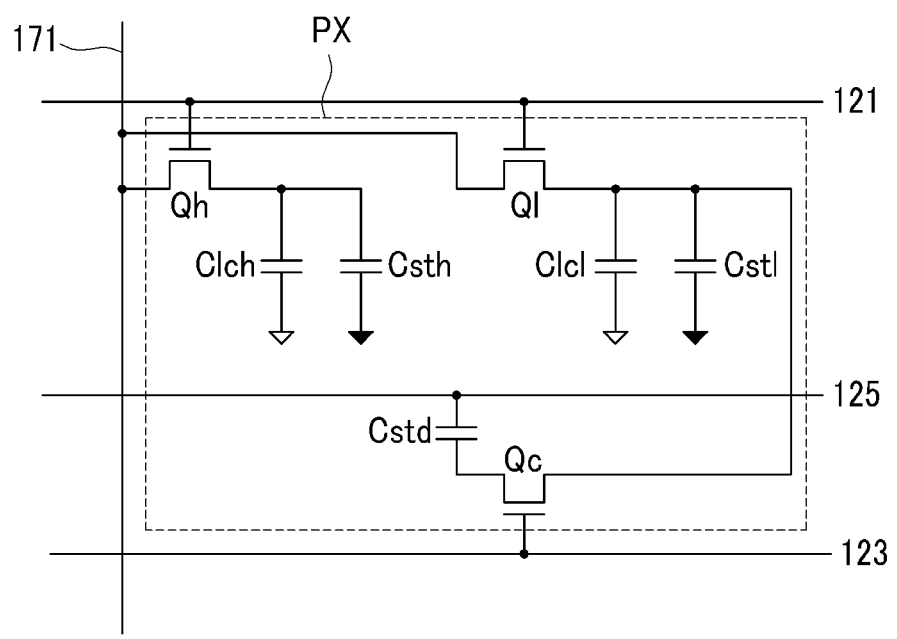
FIG. 3 is an equivalent circuit diagram of one pixel of a liquid crystal display according to an exemplary embodiment of the present invention.

FIG. 3 is an equivalent circuit diagram of one pixel of a liquid crystal display constructed according to an exemplary embodiment of the present invention.

Referring to FIG. 3, a liquid crystal display shown in FIG. 1 and FIG. 2 has signal lines including a gate line 121, a storage electrode line 125, a step-down gate line 123, a data line 171, and a pixel PX connected to the signal lines.

The pixel PX includes first, second, and third thin film transistors Qh, Ql, and Qc, first and second liquid crystal capacitors Clch and Clcl, first and second storage capacitors Csth and Cstl, and a step-down capacitor Cstd.

The first and second thin film transistors Qh and Ql are respectively connected to the gate line 121 and the data line 171, and the third thin film transistor Qc is connected to the step-down gate line 123.

The first and second thin film transistors Qh and Ql each have a control terminal connected to the gate line 121, and an input terminal connected to the data line 171. The transistors Qh and Ql also have output terminals connected, respectively, to the first and second liquid crystal capacitors Clch and Clcl and the first and second storage capacitors Csth and Cstl.

The third thin film transistor Qc has a control terminal connected to the step-down gate line 123, an input terminal connected to the second liquid crystal capacitor Clcl, and an output terminal connected to the step-down capacitor Cstd.

The first and second liquid crystal capacitors Clch and Clcl are formed by the overlap of the first and second sub-pixel electrodes 191*h* and 191*l* with the common electrode 270 of the upper panel 200. The first and second storage capacitors Csth and Cstl are formed by the overlap of the storage electrode line 125 as well as the storage electrode 129 with, respectively, the first and second sub-pixel electrodes 191*h* and 191*l*.

The step-down capacitor Cstd is connected to the output terminal of the third thin film transistor Qc and the storage electrode line 125. The storage electrode line 125 and the output terminal of the third thin film transistor Qc overlap each other via an insulator.

In operation, a gate-on voltage Von is applied to the gate line 121 to turn on the first and second thin film transistors Qh and Ql. Then, a data voltage is applied to the data line 171 so as to be simultaneously applied to the first and second sub-pixel electrodes 191*h* and 191*l*. The first and second liquid crystal capacitors Clch and Clcl are charged by the difference between the common voltage Vcom of the common electrode 270 and the voltage of the first and second sub-pixel electrodes 191*h* and 191*l* such that the charging voltage of the first liquid crystal capacitor Clch is the same as the charging voltage of the second liquid crystal capacitor Clcl. Here, gate-off voltage Voff is applied to the step-down gate line 123.

Next, gate-off voltage Voff is applied to the gate line 121 and at the same time, gate-on voltage Von is applied to step-down gate line 123. This turns, the first and second switching elements Qh and Qloff, and turns the third switching element Qc on. This discharges Clcl into Cstd, reducing the voltage across Clcl.

As above, the invention includes liquid crystal displays driven by frame inversion. In one implementation of frame inversion, the data line 171 transmits the data voltage for the present frame as a positive voltage with respect to the common voltage Vcom. This causes negative charge to accumulate in the step-down capacitor Cstd. If the third switching element Qc is then turned on, the positive charge of the second sub-pixel electrode 191*l* flows into the step-down capacitor Cstd through the third switching element Qc, so that positive charge accumulates in the step-down capacitor Cstd and the voltage of the second liquid crystal capacitor Clcl is decreased. Next, in the subsequent frame, negative charge is accumulated in the second sub-pixel electrode 191*l*. The third switching element Qc is again turned on, so that the negative charges of the second sub-pixel electrode 191*l* flow into the step-down capacitor Cstd, reducing the voltage of the second liquid crystal capacitor Clcl.

As described above, according to the present exemplary embodiment, the charging voltage of the second liquid crystal capacitor Clcl is lower than the charging voltage of the first liquid crystal capacitor Clch regardless of the polarity of the data voltage. Accordingly, the charging voltages of the first and second liquid crystal capacitors Clch and Clcl are different such that the lateral view of the liquid crystal display may be improved.

Figure 4:
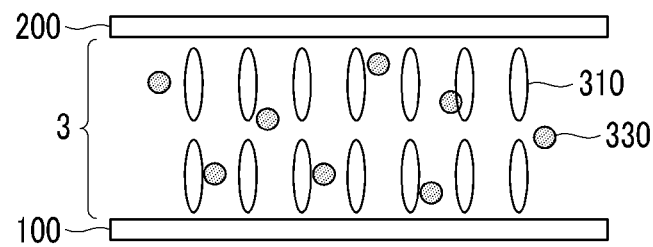
FIG. 4 to FIG. 6 are views showing a method providing a pre-tilt to liquid crystal molecules by using monomers polymerized by ultraviolet rays.
Figure 5:
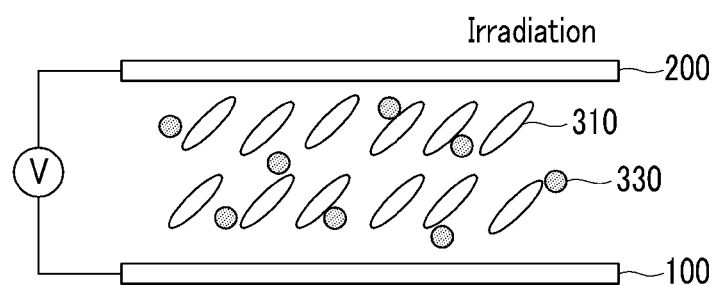
Figure 6:
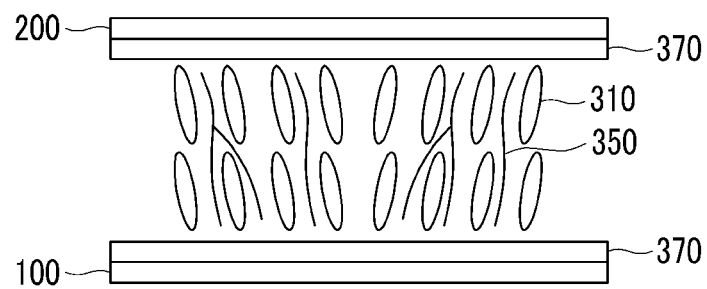

Next, a process of providing a pre-tilt to liquid crystal molecules by using monomers polymerized by ultraviolet rays will be described with reference to FIG. 4 to FIG. 6. FIG. 4 to FIG. 6 are views showing a method of providing a pre-tilt to liquid crystal molecules by using monomers polymerized by ultraviolet rays.

Initially, as shown in FIG. 4, a liquid crystal layer 3 is formed between a lower panel 100 and an upper panel 200. The liquid crystal layer 3 has liquid crystal molecules 310 as well as a monomer 330. The monomer 330 may be a reactive mesogen that is hardened by a polymerization reaction via exposure to ultraviolet rays. The monomer 330 is added in a small amount between the liquid crystal molecules 310, generally in the range of 0.1-0.5 wt % of the liquid crystal.

Next, as shown in FIG. 5, a data voltage is applied between the first and second sub-pixel electrodes 191*a* and 191*b* and the common electrode 270, generating an electric field in the liquid crystal layer 3. This aligns the liquid crystal molecules 310 of the liquid crystal layer 3 in a predetermined direction. In FIG. 5, the liquid crystal molecules 310 are arranged in one direction, however one pixel has minute branch electrodes 91*h* and 91*l* that are arranged in four directions as shown in FIG. 1, so as to arrange the liquid crystal molecules in four directions.

If ultraviolet rays are irradiated onto the arranged liquid crystal layer 3, the monomer 330 is polymerized to form a first polymer 350 and a second polymer 370, as shown in FIG. 6.

The first polymer 350 is formed inside the liquid crystal layer 3. The second polymer 370 contacts the display panels 100 and 200, i.e., it is formed as a film that coats the surface of the uppermost layer of the display panels 100 and 200 (this uppermost layer is typically, although not necessarily, an alignment layer). In other words, ultraviolet irradiation polymerizes some of the monomer 330 to form the polymer 370 on the surface of the display panels 100 and 200. Irradiation polymerizes the rest of the monomer 330 to form polymer 350 which remains between the liquid crystal molecules 310. As the first and second polymers 350 and 370 are formed between the already-aligned liquid crystal molecules, the second polymers 350, 370 are formed in predetermined directions, and thus help to maintain the pre-tilt orientation of the liquid crystal molecules 310. That is, the second polymers 350, 370 at least partially maintain a pre-tilt, or orientation that is already present in the liquid crystal when the second polymers 350, 370 are polymerized.

One of ordinary skill in the art will realize that the above-described process largely eliminates the need to pattern the common electrode 270, as well as the need for an alignment layer. This has the advantage of shortening and simplifying the overall manufacturing process. Also, the transmittance is increased by about 20%, and when the black gray is changed into an arbitrary gray, the phenomenon that the liquid crystal molecules are oriented excessively slow is largely prevented, thus improving picture quality. Finally, reducing the amount of movement that the liquid crystal undergoes results in a reduction in static electricity generated. Thus, in some embodiments, it is not necessary for the polarizer to be treated for static electricity prevention, which further reduces process time and expense.

In the present exemplary embodiment, to ensure sufficient polymerization of monomer 330, the ultraviolet rays are irradiated with energy of at least 10 J, and the monomer 330 is irradiated for about five minutes with an irradiation amount of 35 mW/cm2 per second through a light exposer for ultraviolet rays. However, the ultraviolet rays may also damage layers made of organic material, such as the upper passivation layer 180$q$ described above. More specifically, irradiation heats the upper passivation layer 180$q$ to a different degree than its neighboring layer (the color filter 230 or the lower passivation layer 180$p$). The upper passivation layer 180$q$ and its neighboring layer thus undergo differing amounts of thermal expansion, thereby generating stresses in both layers as well as a lifting phenomenon. As a result, the pixel electrode 191 may be cracked and vapor generated in the damaged upper passivation layer 180$q$ may flow into the liquid crystal layer 3.

To alleviate this problem, a representative molecule structure of the monomer will be described with reference to FIG. 7 and FIG. 8, and a wavelength of light used for a polymerization reaction will be described.

Figure 7:
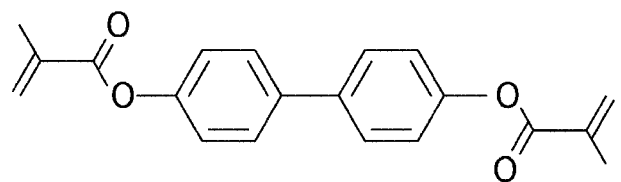
FIG. 7 is a molecule structure of a monomer according to an exemplary embodiment of the present invention.
Figure 8:
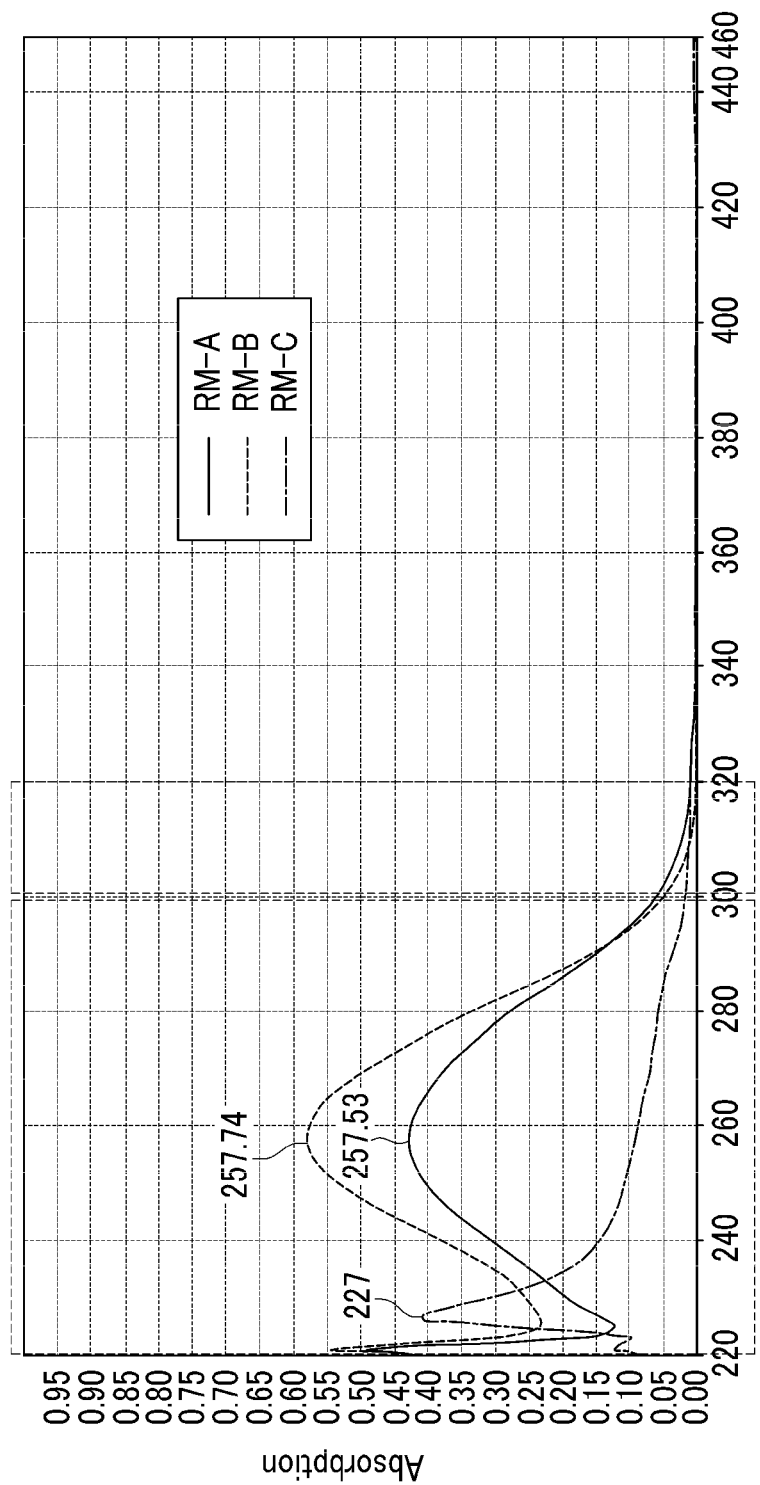
FIG. 8 is a graph showing absorption according to wavelength with respect to a monomer.

FIG. 7 is a molecule structure of a monomer according to an exemplary embodiment of the present invention, and FIG. 8 is a graph showing absorption according to wavelength with respect to a monomer.

FIG. 7 is a formula showing a molecule structure of an RM-B material as one kind of monomer used.

On the other hand, FIG. 8 is a graph of absorption according to the wavelengths of RM-A, RM-B, and RM-C reactivity mesogens of three kinds, wherein the vertical axis represents absorption and the horizontal axis represents a wavelength (nm).

As can be observed, three reactivity mesogens of FIG. 8 mainly absorb light of less than 320 nm. In particular, the RM-A material has maximum absorption at 257.53 nm, the RM-B material has maximum at 257.74 nm, and the RM-C material has maximum absorption at 227 nm.

If light corresponding to maximum absorption is used, the reactivity mesogen may be polymerized with maximum efficiency. However, light at wavelengths of less than 300 nm is absorbed or reflected by the glass substrate 210 or 110 of the upper panel 200 or lower panel 100. Accordingly, polymerization of the reactivity mesogen inside the liquid crystal layer 3 is mainly caused by 300 to 320 nm wavelength light.

Therefore, when the upper passivation layer 180$q$ is made of an organic material, it typically has a bonding combination that is broken at a lower energy than the light of the wavelength of 300 to 320 nm. This means that light with wavelengths less than 300 nm is absorbed by layer 180$q$ (i.e., breaks bonds in the layer 180$q$, instead of passing through), where it both breaks down the organic material of layer 180$q$ and heats the layer, expanding and damaging it.

One embodiment of the invention alleviates this problem by forming blocking film 189 on the upper passivation layer 180$q$, preventing the light of the wavelength that influences the organic material (i.e., light with wavelengths less than 300 nm) from reaching the upper passivation layer 180$q$.

In an exemplary embodiment of the present invention, although the size of the panel is increased, the material for the blocking film 189 may be formed with a uniform thickness, the characteristics thereof may be uniform and stable, and good transmittance for visible rays may be obtained. That is, in an exemplary embodiment of the present invention, the blocking film 189 is formed of an amorphous titanium oxide (TiOx). The characteristics of this titanium oxide will be described with reference to FIGS. 9-12.

Figure 9:
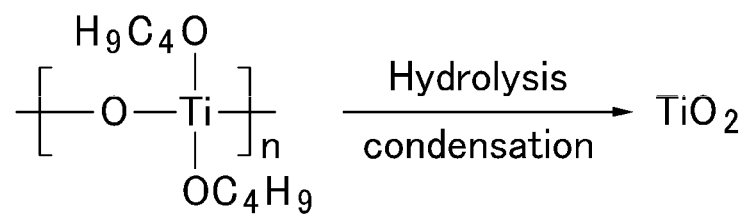
FIG. 9 is a view showing a manufacturing method of titanium oxide according to an exemplary embodiment of the present invention.
Figure 10:
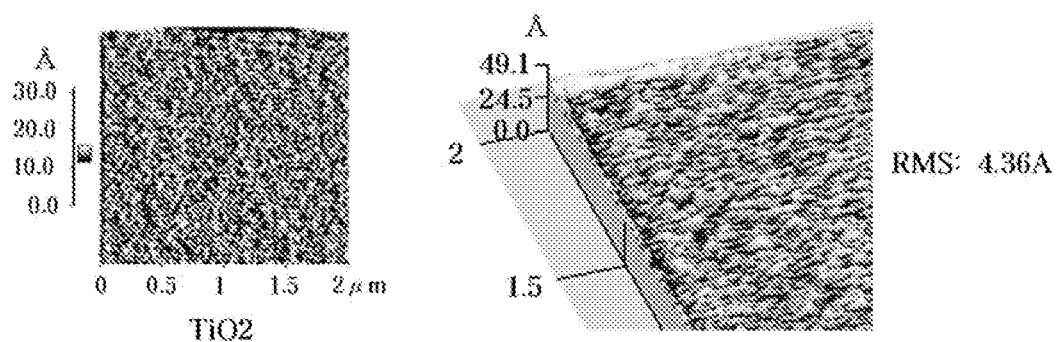
FIG. 10 is picture of a plane and a side surface after forming titanium oxide on a substrate according to an exemplary embodiment of the present invention.
Figure 11:
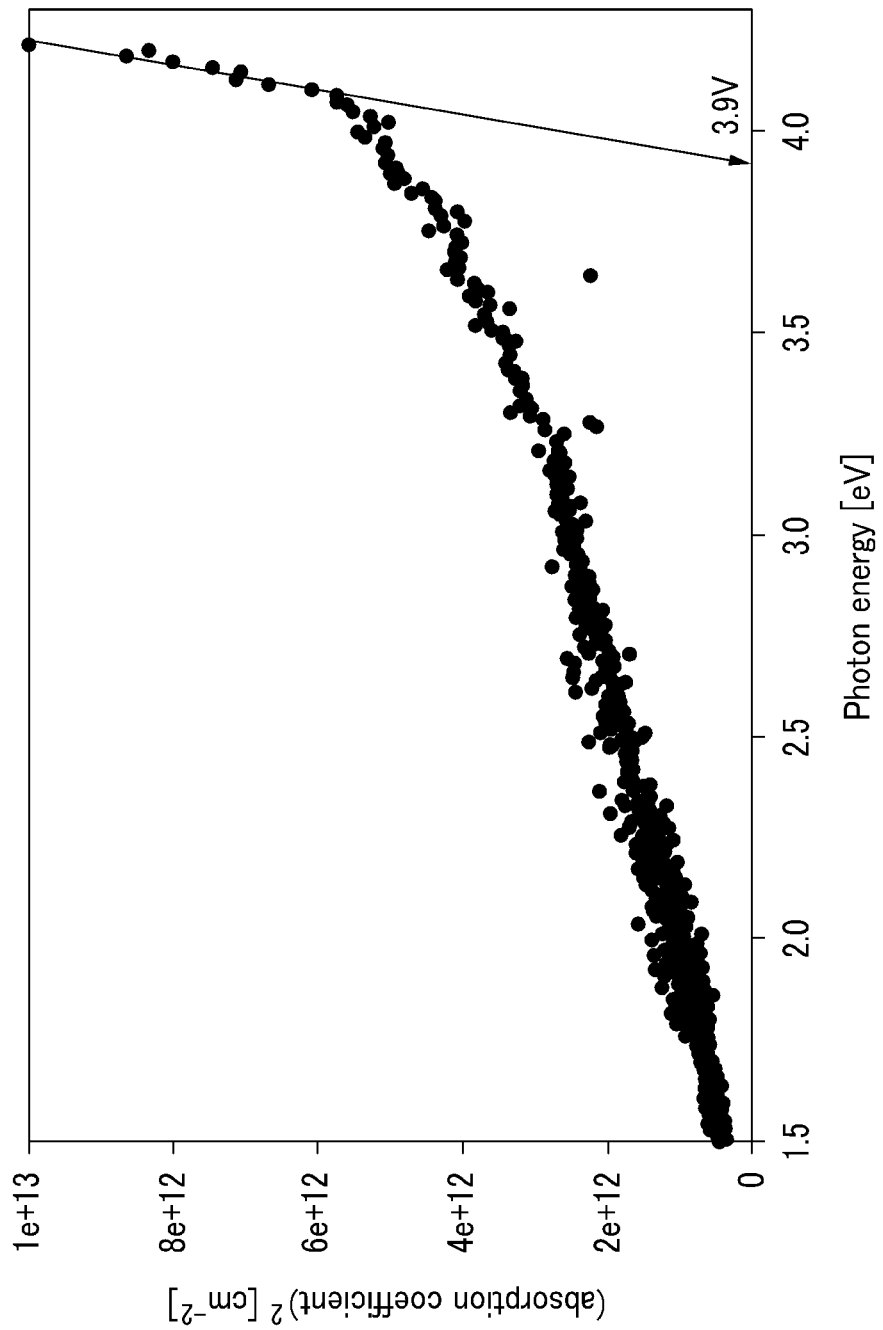
FIG. 11 is a graph of an absorption coefficient of energy to measure an optical band gap of titanium oxide according to an exemplary embodiment of the present invention.
Figure 12:
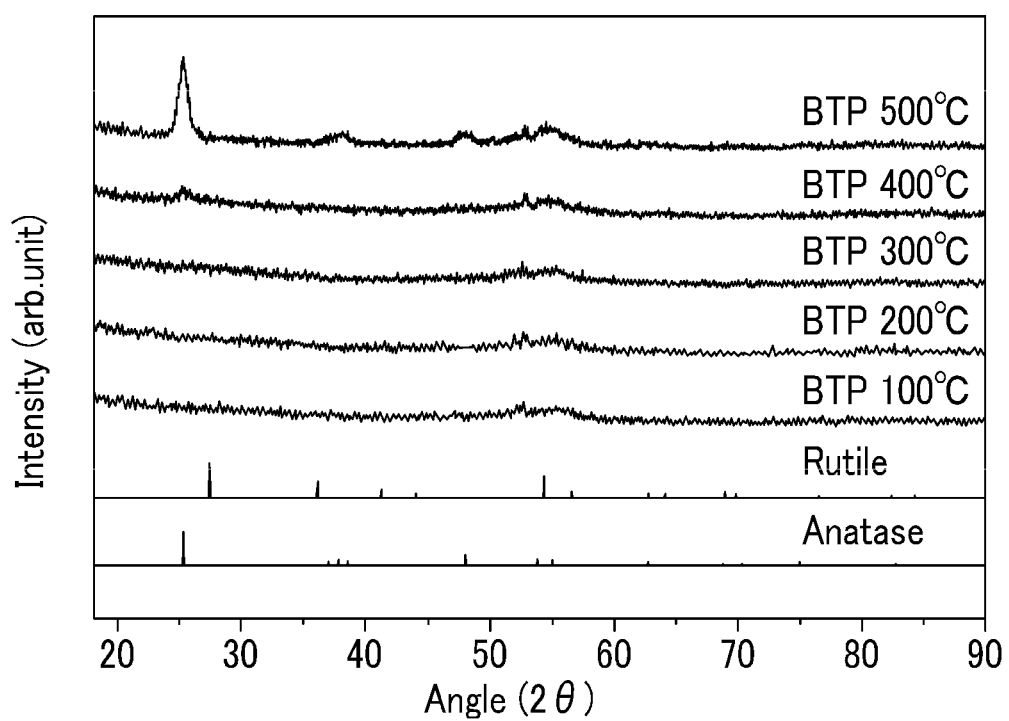
FIG. 12 is a graph of absorption according to angle of titanium oxide according to an exemplary embodiment of the present invention.

FIG. 9 is a view showing a method of manufacturing titanium oxide according to an exemplary embodiment of the present invention. FIG. 10 is picture of plane and side surfaces after forming titanium oxide on a substrate according to an exemplary embodiment of the present invention. FIG. 11 is a graph of an absorption coefficient for energy to measure an optical band gap of titanium oxide according to an exemplary embodiment of the present invention, and FIG. 12 is a graph of absorption according to angle of titanium oxide according to an exemplary embodiment of the present invention.

First, FIG. 9 schematically shows a method of forming the amorphous titanium oxide (TiOx) by using an organic titanate.

In FIG. 9, titanium oxide (TiOx) is formed through a sol-gel reaction involving hydrolysis with a compound such as Tyzor® (polybutyl titanate) of the DuPont™ company, as one of the representative organic titanates. Here, the sol-gel reaction may be carried out at a temperature of less than 300° C., and the TiOx may be TiO2.

FIG. 10 shows the case in which the titanium oxide TiO2 is formed on a silicon wafer. That is, the titanium oxide TiO2 formed on the silicon wafer has flatness of 4.36 Å, which is a desirable flatness for some applications.

FIG. 11 is a graph showing an absorption coefficient for photon energy to obtain an optical band gap of titanium oxide TiO2. According to FIG. 11, the band gap has energy of approximately 3.9 eV. Therefore, when the blocking film 189 is formed of titanium oxide TiO2, incident light having energy of greater than 3.9 eV is absorbed. Thus, a blocking film 189 made of TiO2 will only transmit light having energy below about 3.9 eV. The energy of 320 nm-wavelength light is about 3.9 eV, with energy increasing as wavelength decreases. Thus, the titanium oxide TiO2 layer absorbs ultraviolet rays with wavelengths less than 320 nm, so that only ultraviolet light with wavelength greater than about 320 nm is passed through to the upper passivation layer 180$q$. As above, this largely prevents breakdown of the organic material in the upper passivation layer 180$q$.

A further advantage of employing TiO2 is that it is transparent, as illustrated with reference to FIG. 12. In the graph of FIG. 12, the horizontal axis represents incident angle, and the vertical axis represents absorption intensity of one of the compounds shown. In FIG. 12, BTP represents Tyzor® (polybutyl titanate) of the DuPont™ company, and Rutile and Anatase respectively are a rutile structure and an anatase structure of titanium oxide TiO2. In FIG. 12, a significant spike in absorption intensity indicates that the compound is in crystalline form (as the crystalline form absorbs more incident light than the amorphous state). Accordingly, it may be confirmed that Tyzor® BTP is crystalline at a temperature of 500° C. and is amorphous at a temperature of less than 400° C. Also, the rutile structure and the anatase structures of titanium oxide TiO2 maintain largely uniform absorption at almost all angles, and are thus amorphous, rather than crystalline. Therefore, a liquid crystal display employing a layer of titanium oxide TiO2 will maintain sufficient transmittance.

A cross-sectional view of a liquid crystal panel assembly according to another exemplary embodiment of the present invention will be described with reference to FIG. 13.

Figure 13:
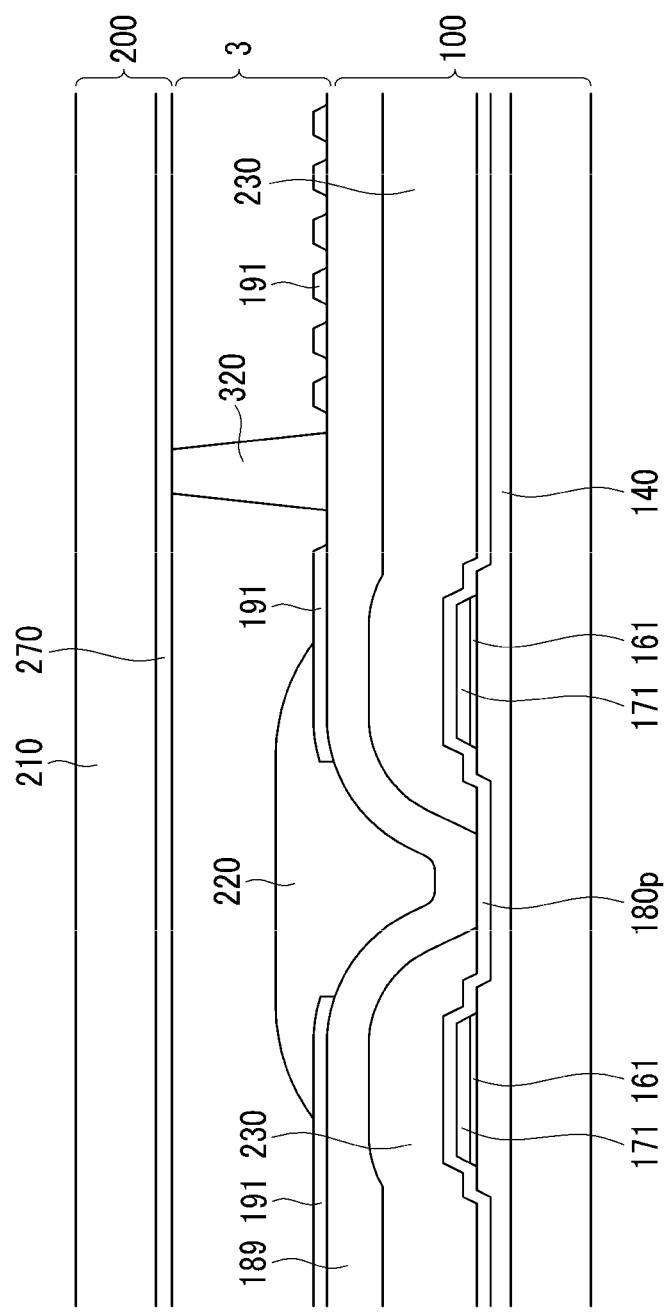
FIG. 13 is a cross-sectional view of a liquid crystal panel assembly according to another exemplary embodiment of the present invention.

FIG. 13 is a cross-sectional view of a liquid crystal panel assembly according to another exemplary embodiment of the present invention.

In FIG. 13, in contrast to the embodiment of FIG. 1 and FIG. 2, a spacer 320 is added, and a blocking film 189 is formed directly on the color filter 230 without the upper passivation layer 180q made of the organic material. Also, the pixel may have a different structure from that of FIG. 1 and FIG. 2. In particular, the spacer 320 is formed with the same material as the light blocking member 220. To form the spacer 320 and the light blocking member 220 together, a translucent mask or a mask including a slit pattern may be used.

On the other hand, the color filter 230 may be made of an organic material, and may be vulnerable to damage from ultraviolet rays. Accordingly, although the upper passivation layer 180q of the organic material is not present, it is necessary to form the blocking film 189 on the color filter 230 to protect the color filter 230.

The present invention may be embodied by a pixel having a different structure from that shown in FIG. 1 and FIG. 2. That is, the present invention can be applied to all liquid crystal displays for providing a pre-tilt to the liquid crystal molecules by polymerizing the monomers of a liquid crystal through ultraviolet rays when forming the liquid crystal layer.

Figure 14:
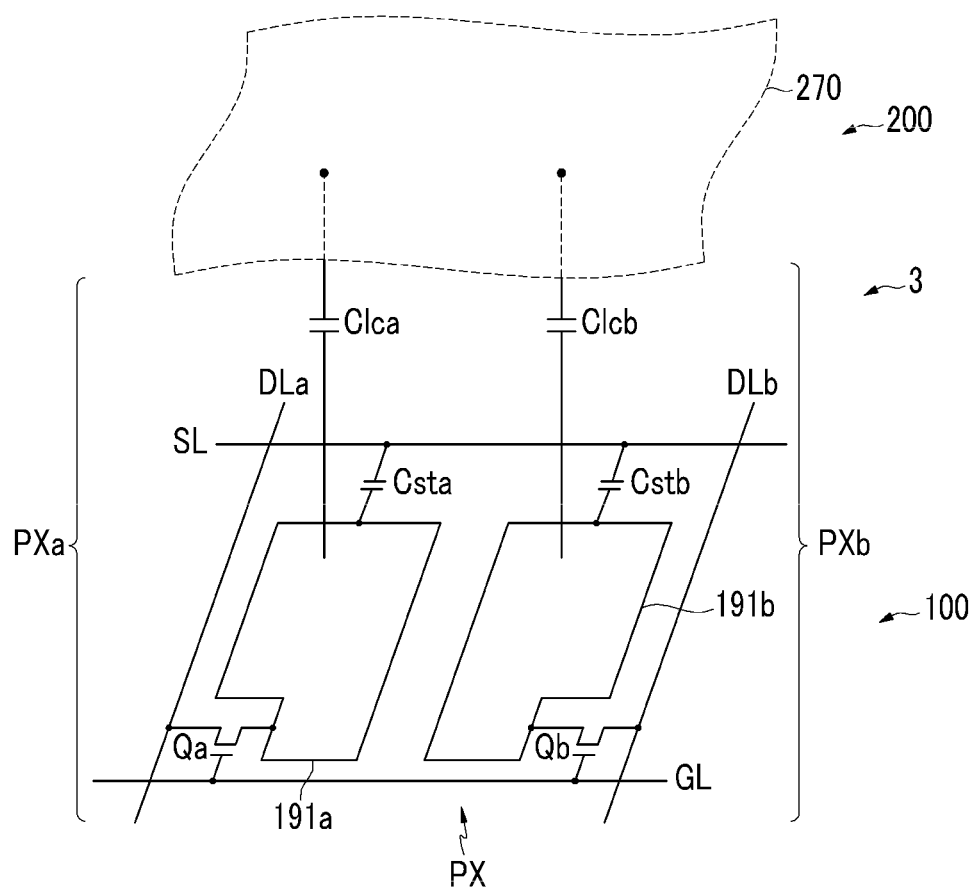
FIG. 14 is an equivalent circuit diagram of one pixel of a liquid crystal display according to an exemplary embodiment of the present invention.

FIG. 14 is an equivalent circuit diagram of one pixel of a liquid crystal display according to an exemplary embodiment of the present invention.

Referring to FIG. 14, a liquid crystal display according to an exemplary embodiment of the present invention includes a thin film transistor array (lower) panel 100 and a common electrode (upper) panel 200 facing each other, and a liquid crystal layer 3 interposed therebetween.

The liquid crystal display according to an exemplary embodiment of the present invention also includes signal lines including a plurality of gate lines GL, a plurality of pairs of data lines DLa and DLb, and a plurality of storage electrode lines SL, and a plurality of pixels PX connected thereto.

The respective pixels PX include a pair of sub-pixels PXa and PXb, and each subpixel PXa/PXb includes a switching element Qa/Qb, a liquid crystal capacitor Clca/Clcb, and a storage capacitor Csta/Cstb.

Each switching element Qa/Qb is a three-terminal element such as a thin film transistor provided on the thin film transistor array panel 100, and includes a control terminal connected to the gate line GL, an input terminal connected to the data line DLa/DLb, and an output terminal connected to the liquid crystal capacitor Clca/Clcb and the storage capacitor Csta/Cstb.

The liquid crystal capacitor Clca/Clcb uses a subpixel electrode 191a/191b and a common electrode 270 as two terminals. The liquid crystal layer 3 between the electrodes 191a/191b and 270 functions as a dielectric material.

The storage capacitor Csta/Cstb serving as an assistant to the liquid crystal capacitor Clca/Clcb is formed as a storage electrode line SL provided on the thin film transistor array panel 100 and a subpixel electrode 191a/191b overlapped with an insulator interposed therebetween, and a predetermined voltage such as the common voltage Vcom is applied thereto.

The voltages charged at the two liquid crystal capacitors Clca and Clcb are established to slightly differ from each other. For example, the data voltage applied to one of the liquid crystal capacitors Clca is established to be always lower or higher than the data voltage applied to the other liquid crystal capacitor Clcb. When the voltages of the two liquid crystal capacitors Clca and Clcb are properly controlled, an image viewed from the lateral side may maximally approximate an image viewed from the frontal side, thereby improving the lateral visibility of the liquid crystal display.

Referring to FIG. 15 to FIGS. 18(a)-18(b), a liquid crystal display according to an exemplary embodiment of the present invention is explained.

Figure 15:
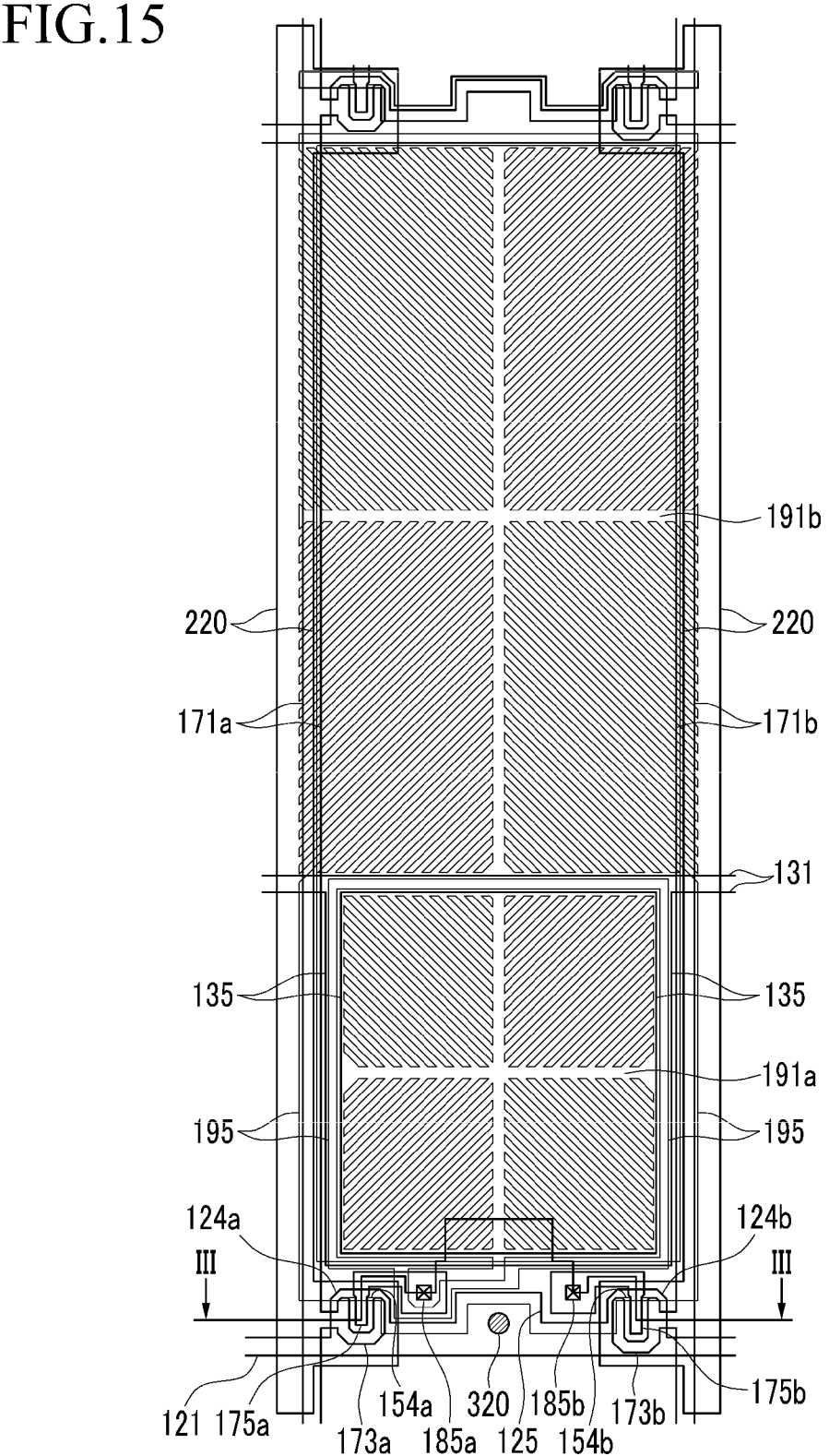
FIG. 15 is a layout view of a liquid crystal display according to an exemplary embodiment of the present invention.
Figure 16:
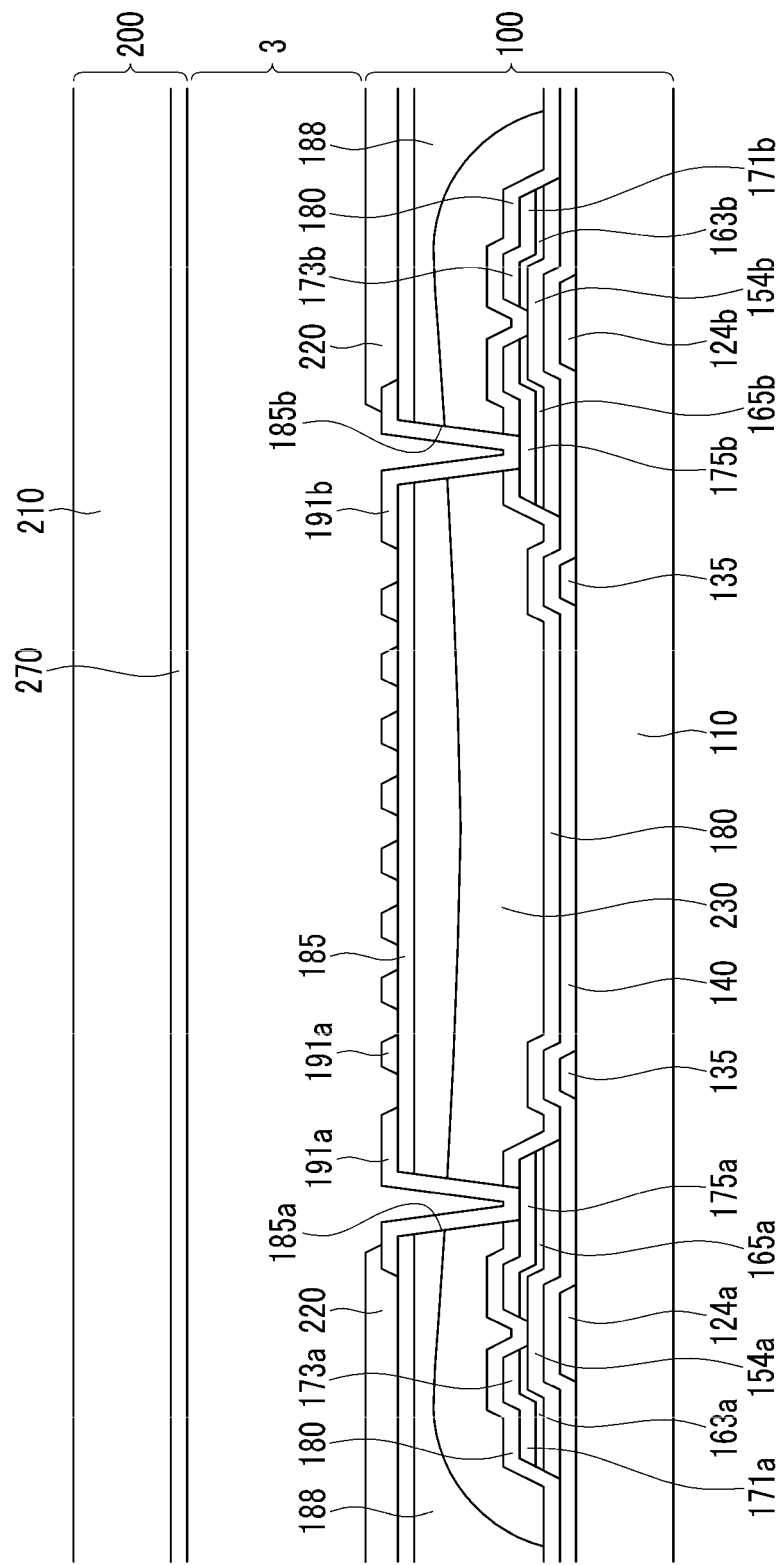
FIG. 16 is a cross-sectional view taken along the line II-II of FIG. 15.
Figure 17:
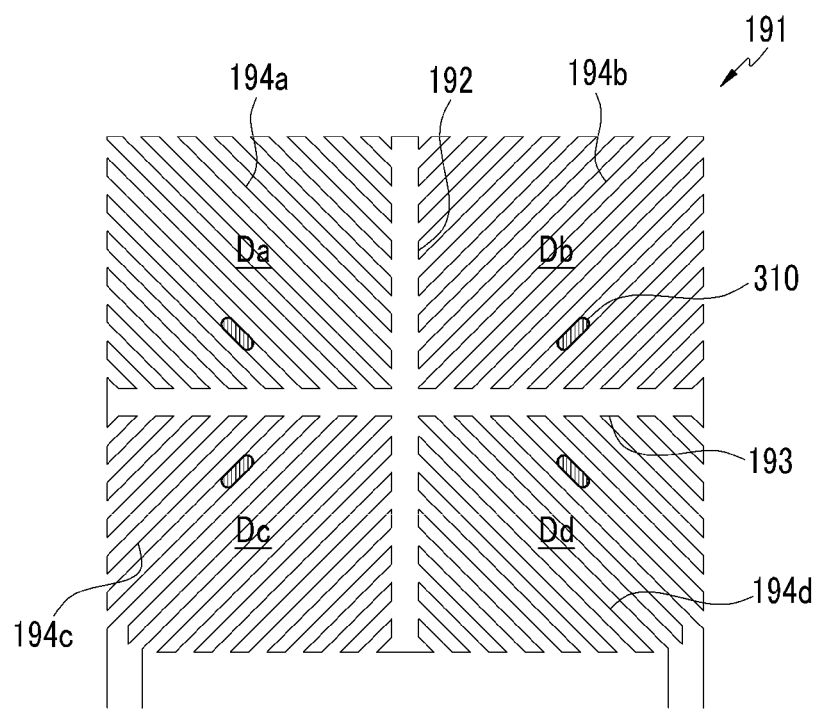
FIG. 17 is a top plan view of a basic pixel electrode in a liquid crystal display according to an exemplary embodiment of the present invention.

FIG. 15 is a layout view of a liquid crystal display according to an exemplary embodiment of the present invention, and FIG. 16 is a cross-sectional view taken along the line II-II of FIG. 15. FIG. 17 is a top plan view of a basic pixel electrode in a liquid crystal display according to an exemplary embodiment of the present invention. FIGS. 18(a)-18(b) are schematic diagrams showing a method for forming a pre-tilt of liquid crystal molecules through an alignment aid according to an exemplary embodiment of the present invention.

Referring to FIG. 15 and FIG. 16, a liquid crystal display according to an exemplary embodiment of the present invention includes the thin film transistor array panel 100 and the common electrode panel 200 facing each other, and the liquid crystal layer 3 interposed between the two panels 100 and 200.

The thin film transistor array panel 100 will be firstly described in detail.

A plurality of gate lines 121 and a plurality of storage electrode lines 131 and 135 are formed on an insulation substrate 110.

The gate lines 121 transmit gate signals and are substantially extended in the transverse direction. Each gate line 121 includes a plurality of first and second gate electrodes 124a and 124b protruding upward.

The storage electrode lines include a stem 131 extending substantially parallel to the gate lines 121 and a plurality of storage electrodes 135 extended from the stem 131.

However, the shapes and arrangements of the storage electrode lines 131 and 135 may be modified in various forms as is understood by one of ordinary skill in the art.

A gate insulating layer 140 is formed on the gate lines 121 and the storage electrode lines 131 and 135, and a plurality of semiconductors 154a and 154b made of, for example, amorphous or crystallized silicon are formed on the gate insulating layer 140.

A plurality of pairs of ohmic contacts 163a, 163b, 165a, and 165b are formed on the first semiconductor 154b, and the ohmic contacts 163a, 163b, 165a, and 165b may be formed of a material such as, for example, n+ hydrogenated amorphous silicon in which an n-type impurity is doped with a high concentration of silicide.

A plurality of pairs of data lines 171a and 171b and a plurality of pairs of first and second drain electrodes 175a and 175b are formed on the ohmic contacts 163a, 163b, 165a and 165b, and on the gate insulating layer 140.

The data lines 171a and 171b transmit data signals, extend substantially in the longitudinal direction, and cross the gate lines 121 and the stems 131 of the storage electrode lines. The data lines 171a/171b include a plurality of first/second source electrodes 173a/173b extending toward the first/second gate electrodes 124a/124b and curved with a "U" shape, and the first/second source electrodes 173a/173b are opposite to the first/second drain electrodes 175a/175b with respect to the first/second gate electrodes 124a/124b.

The first and second drain electrodes 175a and 175b respectively start from one end enclosed by the first and second source electrodes 173a and 173b and are extended upward, and the other end thereof may have a wide area for connection to another layer.

However, the shapes and arrangement of the first and second drain electrodes 175a and 175b and the data lines 171a and 171b may be modified in various forms as is understood by one of ordinary skill in the art.

The first/second gate electrodes 124a/124b, the first/second source electrodes 173a/173b, and the first/second drain electrodes 175a/175b respectively form the first/second thin film transistors (TFT) Qa/Qb along with the first/second semiconductors 154a/154b, and the channels of the first/second thin film transistors Qa/Qb are respectively formed on the first/second semiconductors 154a/154b between the first/second source electrodes 173a/173b and the first/second drain electrodes 175a/175b.

The semiconductors 154a and 154b have a portion that is exposed without being covered by the data lines 171a and 171b and the drain electrodes 175a and 175b, and a portion between the source electrodes 173a and 173b and the drain electrodes 175a and 175b.

A passivation layer 180 preferably made of, for example, silicon nitride or silicon oxide is formed on the data lines 171a and 171b, the drain electrodes 175a and 175b, and the exposed portions of the semiconductors 154a and 154b.

A color filter 230 is formed on the passivation layer 180.

A leveling layer 188 is formed on the color filter 230, which levels the lower layers. The leveling layer 188 is made of an organic material.

A UV-blocking layer 185 is formed on the leveling layer 188, and is transparent.

The UV-blocking layer 185 is made of an organic material including a UV-absorbing agent such as a chromophore, and examples of the chromophore are represented by Formulae 1 and 2.

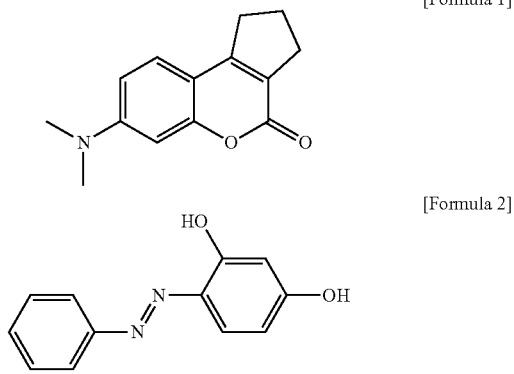

[Formula 1]

[Formula 2]

Firstly, Formula 1 may absorb the light of a wavelength of more than 310 nm and less than 400 nm with respect to 365 nm, and Formula 2 may absorbs the light of a wavelength of more than 310 mm and less than 400 mm with respect to 388 nm.

A material included in the UV-absorbing agent long with those of Formula 1 and Formula 2 may be a material having a chromophore absorbing light of a wavelength under 400 nm, and desirably may be a material absorbing light of a wavelength under 300 nm that damages the organic layer.

A plurality of contact holes 185a and 185b are formed in the passivation layer 180, the color filter 230, the leveling layer 188, and the UV-blocking layer 185 so as to expose the first and second drain electrodes 175a and 175b.

A plurality of pixel electrodes 191 are formed on the UV-blocking layer 185. For example, the pixel electrodes 191 may be formed with a transparent conductive material such as indium tin oxide (ITO) and indium zinc oxide (IZO), or with a reflective material such as aluminum, silver, chromium, and alloys thereof.

The respective pixel electrodes 191 include first and second sub-pixel electrodes 191a and 191b that are separated from each other, and the first and second sub-pixel electrodes 191a and 191b each include one or more basic pixel electrodes shown in FIG. 17, or variants thereof.

The area of the second sub-pixel electrode 191b in the whole pixel electrode 191 may be larger than the area of the first sub-pixel electrode 191a, and in this case, the second sub-pixel electrode 191b is differentiated in size in the basic pixel electrode 191 such that the area thereof is larger than the area of the first sub-pixel electrode 191a by, for example, about 1.0 to about 2.5 times. However, the shape and the area ratio of the first and second sub-pixel electrodes 191a and 191b may be diversely changed as is understood by one of ordinary skill in the art.

The second sub-pixel electrode 191b includes a pair of branches 195 extending according to the data line 171. The branches 195 are disposed between the first sub-pixel electrode 191a and the data lines 171a and 171b, and are connected to the bottom of the first sub-pixel electrode 191a. The first and second sub-pixel electrodes 191a and 191b are physico-electrically connected to the first and second drain electrodes 175a and 175b through the contact holes 185a and 185b so as to receive data voltages from the first and second drain electrodes 175a and 175b.

A black matrix 220 is formed at the part corresponding to the gate line 121, the data lines 171a and 171b, and the first and second thin film transistors.

The common electrode panel 200 will now be described in detail.

With the common electrode panel 200, a common electrode 270 is formed on the entire surface of a transparent insulation substrate 210.

A liquid crystal layer 3 is formed between the thin film transistor array panel 100 and the common electrode panel 200.

A spacer may be formed to maintain the gap of the thin film transistor array panel 100 and the common electrode panel 200, which is not represented in the drawings.

Referring to FIG. 17, the moving direction of liquid crystal molecules on the pixel electrode 191 is explained in detail.

As shown in FIG. 17, the basic pixel electrode 191 may be wholly quadrangular-shaped, and may have a cross-shaped stem portion with transverse and longitudinal stems 193 and 192 extending perpendicular to each other. Furthermore, the basic pixel electrode 191 is partitioned into first to fourth sub-regions Da, Db, Dc, and Dd by way of the transverse and longitudinal stems 193 and 192, and the sub-regions Da to Dd have a plurality of first to fourth micro-branches 194a, 194b, 194c, and 194d, respectively.

The inclination direction of the liquid crystal molecules 310 may be determined by the micro-branches 194a-194d of the pixel electrodes 191, and the liquid crystal molecules 310 are inclined in the direction parallel to the length direction of the micro-branches 194a-194d. In an exemplary embodiment of the present invention, the length directions in which the micro-branches 194a-194d are extended in one pixel PX are all four directions such that the inclined directions of the liquid crystal molecules 310 are all four directions. Thereby, four domains having different alignment directions of the liquid crystal molecules 310 are formed in the liquid crystal layer 3. Therefore, the viewing angle of the liquid crystal display may be widened by varying the inclined directions of the liquid crystal molecules.

In addition, the widths of the micro-branches 194a to 194d may be enlarged when coming closer to the transverse stem 193 or the longitudinal stem 192.

FIGS. 18(a)-18(b) are schematic diagrams showing a method for forming a pre-tilt angle of liquid crystal molecules through an alignment aid according to an exemplary embodiment of the present invention.

Firstly, a thin film transistor array panel 100 and a common electrode panel 200 are respectively manufactured.

The thin film transistor array panel 100 may be manufactured, for example, by the method described below.

A plurality of thin films are deposited on a substrate 110, and are patterned to sequentially form a gate line 121 including gate electrodes 124a and 124b, a gate insulating layer 140, semiconductors 154a and 154b, data lines 171a and 171b respectively including source electrodes 173a and 173b, drain electrodes 175a and 175b, and a passivation layer 180. A color filter 230 and a leveling layer 188 are formed on the passivation layer 180.

A UV-blocking layer 185 is formed on the leveling layer 188, and a conductive layer such as, for example, ITO or IZO is deposited and patterned to form a pixel electrode 191 including a longitudinal stem 192, a transverse stem 193, and a plurality of micro-branches 194a, 194b, 194c, and 194d extended therefrom, as shown in FIG. 17

Next, an alignment layer is coated on the pixel electrode 191.

The common electrode panel 200 may be manufactured, for example, by the method described below.

A common electrode 270 is formed on a substrate 210. An alignment layer is coated on the common electrode 270.

Next, the thin film transistor array panel 100 and the common electrode panel 200 that are manufactured through the above-described method are assembled, and a liquid crystal layer 3 is formed by injecting a mixture of liquid crystal molecules 310 and a reactive mesogen 50 therebetween. However, the liquid crystal layer 3 may be formed by a method in which the mixture of the liquid crystal molecules 310 and the reactive mesogen 50 is dripped on the thin film transistor array panel 100 or the common electrode panel 200.

An alignment polymer 50a formed by the polymerization of the reactive mesogen 50 has a function of controlling a pre-tilt as an initial alignment direction of the liquid crystal 310. The reactive mesogen 50 has a similar shape to the liquid crystal molecules, and includes a core group forming a core axis and a terminal group connected thereto.

The reactive mesogen 50 according to an exemplary embodiment of the present invention has, for example, the mesogen as the core group and a photo-polymerizable group as the terminal group.

Next, referring to FIG. 18 (a) and FIG. 17, voltages are applied to the pixel electrode 191 and the common electrode 270. The liquid crystal molecules 310 and the reactive mesogen 50 are inclined in a direction parallel to the length direction of the micro-branches 194a-194d of the pixel electrode 191 by the application of the voltages. The liquid crystal molecules 310 near the alignment layer may maintain vertical alignment by chains 11a and 21a of the alignment layers.

First light 1 is irradiated in a state in which the voltages are applied between the pixel electrode 191 and common electrode 270. The first light has a wavelength that can polymerize the reactive mesogen 50, such as, for example, ultraviolet rays or high pressure mercury lamp light. Accordingly, the reactive mesogen 50 that is agglomerated is polymerized to form the alignment polymer 50a. The alignment polymer 50a can control the pre-tilt of the liquid crystal molecules 310.

The voltages applied to the pixel electrode 191 and the common electrode are DC voltages, the magnitude thereof may be in the range of, for example, about 5V to about 20V, and the energy of the first light may be in the range of, for example, about 3 J/cm2 to about 10 J/cm2.

Next, as shown in FIG. 18 (b), the voltages between the pixel electrode 191 and the common electrode 270 are turned off.

Next, light is irradiated to the liquid crystal layer 3 in a state in which the voltages between the pixel electrode 191 and the common electrode 270 are off, thereby increasing the polymerization ratio.

After the light irradiating process, the liquid crystal layer 3 may include the alignment polymer 50a and the non-reacted reactive mesogen 50, and the non-reacted reactive mesogen 50 may cause quality deterioration such as, for example, image sticking if the liquid crystal display is operated for a long time. Therefore, in the additional step represented in FIG. 18 (b), the non-reacted reactive mesogen 50 may be minimized by irradiating light of over 20 J/cm2.

In the light irradiating process, the chemical bond of the organic layer such as the color filter 230 and the leveling layer 188 may be decomposed or the component of the organic layer may diffuse into a liquid crystal layer. As a result, the UV-irradiation may cause image-sticking and an active unfilled area defect such that a portion of the organic layer is unfilled, and this in turn may result in the quality deterioration of products.

In the liquid crystal display according to an exemplary embodiment of the present invention, the UV-blocking layer 185 may maintain the quality of the liquid crystal display by blocking the UV-irradiation of the wavelength under 400 nm so as to not decompose the organic layer.

Figure 19:
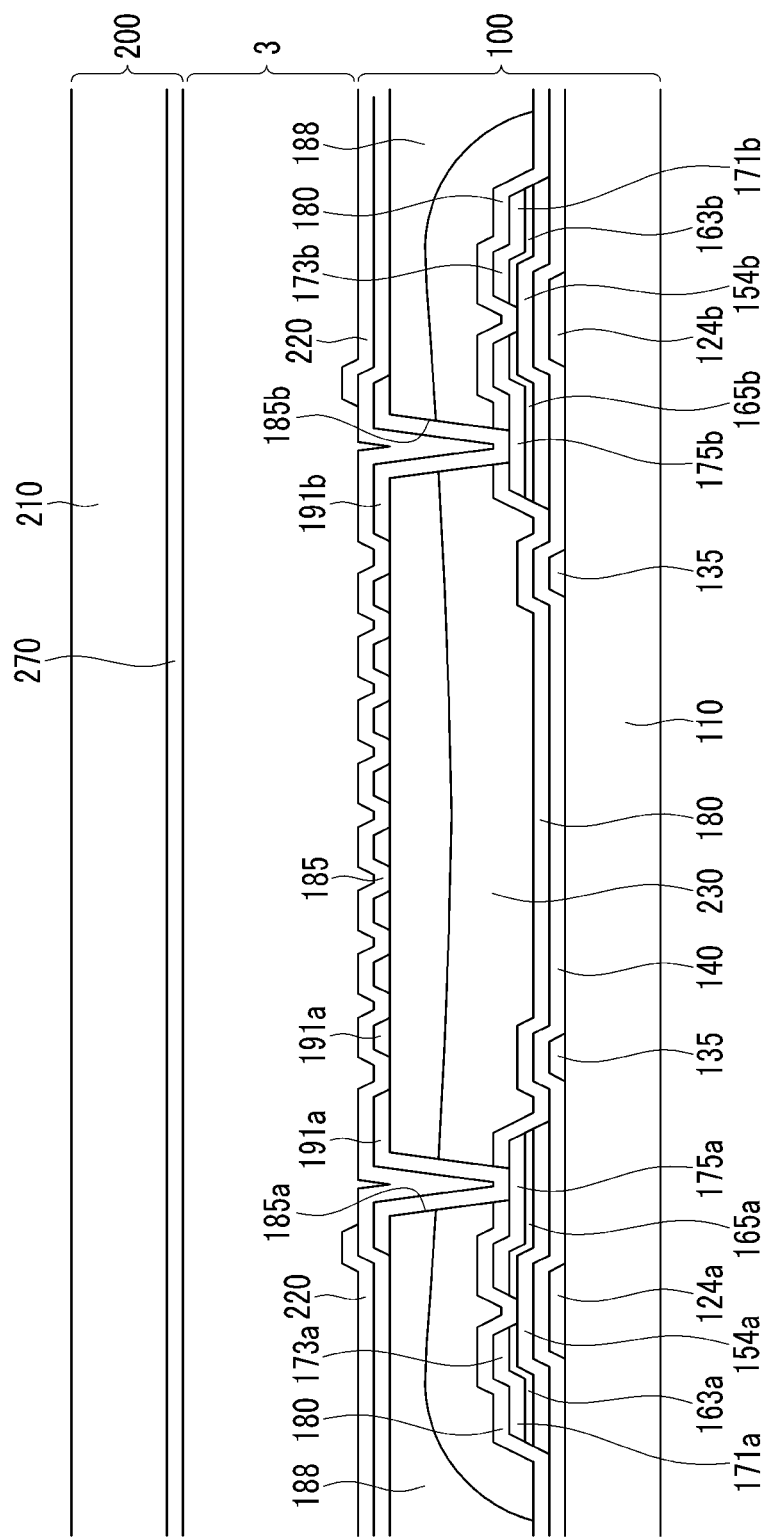
FIG. 19 is a cross-sectional view of an exemplary embodiment of the present invention.

FIG. 19 is a cross-sectional view of another exemplary embodiment of the present invention.

The structure of the liquid crystal display according to the exemplary embodiment is similar to the structure of the liquid crystal display represented in FIG. 15 to FIGS. 18(a)-18(b), and therefore only different parts are explained in detail. The structure of the thin film transistor array panel will be explained, because the structure of the common electrode panel and the method for forming a pre-tilt angle of liquid crystal molecules are same as the above-described structure of the liquid crystal display.

The thin film transistor array panel 100 of FIG. 19 will be described in detail.

A plurality of gate lines 121 and a plurality of storage electrode lines 131 and 135 are formed on an insulation substrate 110. Each gate line 121 includes a plurality of first and second gate electrodes 124a and 124b protruding upward. Also, a protruded part 125 is included between gate electrodes 124a and 124b. The storage electrode lines include a stem 131 extending substantially parallel to the gate lines 121 and a plurality of storage electrodes 135 extended from the stem 131. However, the shapes and arrangements of the storage electrode lines 131 and 135 may be modified in various forms as is understood by one of ordinary skill in the art.

A gate insulating layer 140 is formed on the gate lines 121 and the storage electrode lines 131 and 135, and a plurality of semiconductors 154a and 154b made of, for example, amorphous or crystallized silicon, are formed on the gate insulating layer 140.

A plurality of pairs of ohmic contacts 163a, 163b, 165a, and 165b are formed on the semiconductors 154a and 154b, and the ohmic contacts 163a, 163b, 165a, and 165b may be formed of a material such as, for example, n+ hydrogenated amorphous silicon in which an n-type impurity is doped with a high concentration of silicide.

A plurality of pairs of data lines 171a and 171b and a plurality of pairs of first and second drain electrodes 175a and 175b are formed on the ohmic contacts 163a, 163b, 165a, and 165b, and on the gate insulating layer 140.

The data lines 171a and 171b transmit data signals, extend substantially in the longitudinal direction, and cross the gate lines 121 and the stems 131 of the storage electrode lines. The data lines 171a/171b include a plurality of first/second source electrodes 173a/173b extending toward the first/second gate electrodes 124a/124b and curved with a "U" shape, and the first/second source electrodes 173a/173b are opposite to the first/second drain electrodes 175a/175b with respect to the first/second gate electrodes 124a/124b.

The first and second drain electrodes 175a and 175b respectively start from one end enclosed by the first and second source electrodes 173a and 173b and are extended upward, and the other end thereof may have a wide area for connection to another layer. However, the shapes and arrangement of the first and second drain electrodes 175a and 175b and the data lines 171a and 171b may be modified in various forms.

The first/second gate electrodes 124a/124b, the first/second source electrodes 173a/173b, and the first/second drain electrodes 175a/175b respectively form the first/second thin film transistors (TFT) Qa/Qb along with the first/second semiconductors 154a/154b, and the channels of the first/second thin film transistors Qa/Qb are respectively formed on the first/second semiconductors 154a/154b between the first/second source electrodes 173a/173b and the first/second drain electrodes 175a/175b.

The semiconductors 154a and 154b have a portion that is exposed without being covered by the data lines 171a and 171b and the drain electrodes 175a and 175b, and a portion between the source electrodes 173a and 173b and the drain electrodes 175a and 175b.

A passivation layer 180 made of, for example, silicon nitride or silicon oxide is formed on the data lines 171a and 171b, the drain electrodes 175a and 175b, and the exposed portions of the semiconductors 154a and 154b.

A color filter 230 is formed on the passivation layer 180.

A leveling layer 188 is formed on the color filter 230, which levels the lower layers. The leveling layer 188 is made of an organic material.

A plurality of contact holes 185a and 185b are formed in the passivation layer 180, the color filter 230, and the leveling layer 188 so as to expose the first and second drain electrodes 175a and 175b.

A plurality of pixel electrodes 191 are formed on the leveling layer 188. For example, the pixel electrodes 191 may be formed with a transparent conductive material such as indium tin oxide (ITO) and indium zinc oxide (IZO), or with a reflective material such as aluminum, silver, chromium, and alloys thereof. The respective pixel electrodes 191 include first and second sub-pixel electrodes 191a and 191b that are separated from each other.

The first and second sub-pixel electrodes 191a and 191b are physico-electrically connected to the first and second drain electrodes 175a and 175b through the contact holes 185a and 185b so as to receive data voltages from the first and second drain electrodes 175a and 175b.

A transparent UV-blocking layer 185 is formed on the pixel electrodes 191 and the leveling layer 188.

The UV-blocking layer 185 is made of an organic material including a UV-absorbing agent such as a chromophore, and examples of the chromophore are represented by Formula 1 and 2.

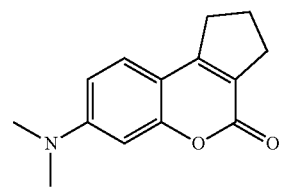

[Formula 1]

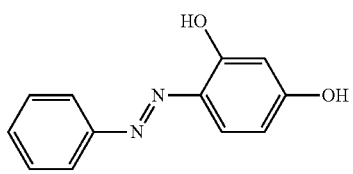

[Formula 2]

Firstly, the material of Formula 1 may absorb light of a wavelength of more than 310 nm and less than 400 nm with respect to 365 nm, and Formula 2 may absorbs light of a wavelength of more than 310 mm less than 400 mm with respect to 388 nm.

A material included in the UV-absorbing agent as well as the materials of Formula 1 and Formula 2 may be a material having a chromophore absorbing light of a wavelength under 400 nm, and desirably may be a material absorbing light of a wavelength under 300 nm that damages the organic layer.

A black matrix 220 is formed at the part corresponding to the gate line 121, the data lines 171a and 171b, and the first and second thin film transistors.

FIGS. 20(a)-20(b) show the UV-blocking effect of the UV-blocking layer according to an exemplary embodiment of the present invention.

To evaluate the UV-absorbing effect, a UV-blocking layer is formed on a reflecting plate (wafer), and reflectance of the plate is measured. As the absorbance is higher, the reflectance of the graph is the lower. The low reflectance means a high UV-blocking effect.

The x-axis of the graph shows the thickness of the UV-blocking layer and its unit is um.

The left axis of y-axis shows the normalized value of the reflectance, which is represented by S. The reference value of the normalization is the reflectance of the case in which the UV-blocking layer does not exist, and the right side y-axis shows the reflectance, which is represented by R.

FIG. 20 (a) is the case in which the material of Formula 1 is deposited, and shows the reflectance of the UV-blocking layer with a refractive index of about 1.25 and a minimum value of S of about 0.48% when the thickness of the UV-blocking layer is about 0.1295 um. According to FIG. 20 (a), it may be confirmed that the UV is sufficiently absorbed in the case in which the UV-blocking layer has a thickness of more than 0.1 um less and than 0.15 um.

FIG. 20 (b) is the case in which the material of Formula 1 is deposited, and shows the reflectance of the UV-blocking layer with a refractive index of about 1.80 and a minimum value of S of about 0.56% when the thickness of the UV-blocking layer is about 0.0698 um. According to FIG. 20 (b), it may be confirmed that the UV is sufficiently absorbed in the case in which the UV-blocking layer has a thickness of more than 0.06 um and less than 0.095 um.

The UV-blocking effect can be controlled by the thickness and the UV-absorbing agent content of the UV-blocking layer.

In the above-described exemplary embodiments of the present invention, the UV-blocking layer 185 is formed on the thin film transistor array panel 100, but the UV-blocking layer 185 may be formed on the common electrode panel 200 if the color filter 230 is formed on the upper substrate 210 to protect the organic materials in the common electrode panel 200.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first panel;
a second panel including:
   a thin film transistor;
   an insulating layer comprising an organic material disposed on the thin film transistor;
   a blocking film disposed directly on the insulating layer; and
   a pixel electrode disposed on the blocking film; and
a liquid crystal layer between the first panel and the second panel, the liquid crystal layer having liquid crystal with a pre-tilt at least partially maintained by a polymerized polymer,
wherein the blocking film comprises an ultraviolet absorbing agent.

2. The liquid crystal display of claim 1, wherein the ultraviolet absorbing agent is amorphous titanium oxide.

3. The liquid crystal display of claim 1, wherein the polymer includes:
   a first polymerized polymer within the liquid crystal layer, and
   a second polymer disposed along an inner surface of the first panel and an inner surface of the second panel, the inner surfaces each facing the liquid crystal layer.

4. The liquid crystal display of claim 1, wherein the second panel further includes a color filter disposed under the insulating layer.

5. The liquid crystal display of claim 1,
wherein the pixel electrode includes a plurality of branch electrodes.

6. The liquid crystal display of claim 5, wherein the pixel electrode has a plurality of sub-regions each having ones of the branch electrodes extending in a different direction from the ones of the branch electrodes in the other sub-regions.

7. The liquid crystal display of claim 6, wherein intervals between the branch electrodes of one sub-region are different from intervals between branch electrodes of another sub-region.

8. The liquid crystal display of claim 1, wherein the second panel further comprises:
a first substrate;
a gate line disposed on the first substrate;
a step-down gate line parallel to the gate line;
a storage electrode line parallel to the gate line;
a gate insulating layer covering the gate line, the step-down gate line, and the storage electrode line;
a data line intersecting the gate line;
first and second sub-pixel electrodes disposed on the insulating layer and the blocking film; and
the thin film transistor comprising a first thin film transistor and a second thin film transistor,
wherein the first thin film transistor is connected to the gate line, the data line, and the first sub-pixel electrode; and
wherein the second thin film transistor is connected to the gate line, the data line, and the second sub-pixel electrode.

9. A method for manufacturing a liquid crystal display, comprising:
on a second panel, sequentially forming a thin film transistor, a color filter, an insulating layer comprising an organic material, a blocking film and a pixel electrode, wherein the blocking film is disposed directly on the insulating layer;
forming a liquid crystal layer between an first panel and the second panel;
applying an electric field to the liquid crystal layer; and
irradiating ultraviolet rays onto the liquid crystal.

10. The method of claim 9, wherein
the liquid crystal layer includes a polymerized monomer.

11. The method of claim 10, wherein
the monomer is a reactivity mesogen.

12. The method of claim 10, wherein
the monomer is about 0.1-0.5 wt % of the liquid crystal layer.

13. The method of claim 10, wherein
the polymerized monomer further comprises:
   a first polymer disposed in the liquid crystal layer, and
   a second polymer disposed along surfaces of the first panel and the second panel that face each other.

14. The method of claim 9, wherein
ultraviolet rays irradiated onto the liquid crystal layer have a wavelength of about 300 nm to about 320 nm.

15. The method of claim 9, further comprising
patterning the pixel electrode to form a plurality of branch electrodes.

16. The method of claim 9, wherein
the blocking layer comprises an ultraviolet absorbing agent.

17. The method of claim 16, wherein
the ultraviolet absorbing agent is amorphous titanium oxide.

18. A liquid crystal display comprising:
a first substrate;
a second substrate facing the first substrate;
a field generating electrode disposed on at least one of the first substrate and the second substrate; and
a liquid crystal layer interposed between the first substrate and the second substrate, the liquid crystal layer comprising liquid crystal molecules and a reactive mesogen,
wherein at least one of the first substrate and the second substrate includes an ultraviolet (UV)-blocking layer, the UV-blocking layer includes a UV-absorbing agent, and the UV-absorbing agent is an organic material including a chromophore comprising at least one selected from compounds represented by Formulae 1 and 2:

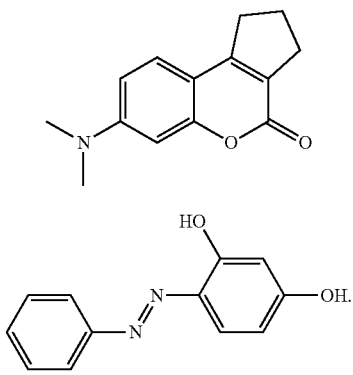

[Formula 1]

[Formula 2]

19. The liquid crystal display of claim 18, wherein the reactive mesogen is polymerized to an alignment polymer through a UV light irradiating process.
20. The liquid crystal display of claim 19, wherein the UV-blocking layer is disposed on the substrate that is not irradiated by the UV light among the first and second substrates.
21. The liquid crystal display of claim 20, wherein the UV-blocking layer is disposed on or under the field generating electrode.
22. The liquid crystal display of claim 21, wherein the UV-absorbing agent absorbs light having a wavelength of less than 400 nm.
23. The liquid crystal display of claim 21, wherein a thickness of the UV-blocking layer is over 0.05 um.
24. A method for manufacturing a liquid crystal display, comprising:
    forming a gate line including a gate electrode on a first substrate;
    forming a gate insulating layer on the gate line;
    forming a data line including a source electrode and a drain electrode facing the source electrode on the gate insulating layer;
    forming a color filter;
    forming a leveling layer on the color filter;
    forming an ultraviolet (UV)-blocking layer on the leveling layer;
    forming a common electrode on a second substrate; and
    interposing a mixture comprising liquid crystal molecules and a reactive mesogen between the first substrate and the second substrate,
wherein the UV-blocking layer includes a UV-absorbing agent, and the UV-absorbing agent is an organic material including a chromophore.
25. The method of claim 24, further comprising forming a pixel electrode on the UV-blocking layer of the first substrate.
26. The method of claim 24, further comprising forming a pixel electrode under the UV-blocking layer of the first substrate.
27. The method of claim 24, further comprising:
    applying a voltage to the pixel electrode and the common electrode; and
    irradiating light to the mixture in the state in which the voltage is applied to the pixel electrode and the common electrode to light-polymerize the reactive mesogen.
28. The method of claim 27, further comprising:
    turning off the voltage to the pixel electrode and the common electrode; and
    irradiating light to the mixture in the state in which the voltage is not applied to the pixel electrode and the common electrode to light-polymerize the reactive mesogen.
29. The method of claim 24, wherein the UV-absorbing agent absorbs light having a wavelength of less than 400 nm.
30. The method of claim 24, wherein the chromophore comprises at least one selected from compounds represented by Formulae 1 and 2:

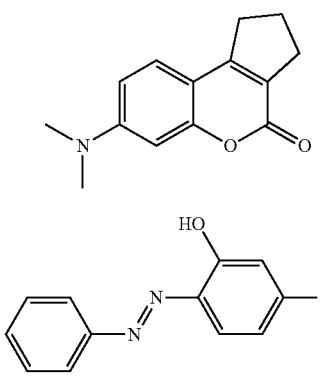

[Formula 1]

[Formula 2]

* * * * *